(12) United States Patent
Na et al.

(10) Patent No.: US 12,164,766 B2
(45) Date of Patent: Dec. 10, 2024

(54) STORAGE DEVICE AND OPERATING METHOD THEREOF

(71) Applicant: SAMSUNG ELECTRONICS CO., LTD., Suwon-si (KR)

(72) Inventors: Jongsung Na, Hwaseong-si (KR); Youngseop Shim, Seoul (KR); Kyungduk Lee, Seongnam-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 109 days.

(21) Appl. No.: 17/897,371

(22) Filed: Aug. 29, 2022

(65) Prior Publication Data
US 2023/0096408 A1    Mar. 30, 2023

(30) Foreign Application Priority Data
Sep. 27, 2021   (KR) ................... 10-2021-0127545

(51) Int. Cl.
*G06F 12/00*   (2006.01)
*G06F 3/06*   (2006.01)

(52) U.S. Cl.
CPC .......... *G06F 3/0604* (2013.01); *G06F 3/0619* (2013.01); *G06F 3/0634* (2013.01); *G06F 3/0673* (2013.01)

(58) Field of Classification Search
CPC .... G06F 3/0604; G06F 3/0619; G06F 3/0634; G06F 3/0673; G06F 3/0659; G06F 11/30; G06F 11/3034; G06F 11/3485; G06F 3/061; G06F 3/0658; G06F 3/0614; G06F 3/0653; G06F 11/1044

USPC ........................................................ 711/154
See application file for complete search history.

(56) References Cited

U.S. PATENT DOCUMENTS

| | | | |
|---|---|---|---|
| 9,514,827 B1* | 12/2016 | Nam | G06F 3/0619 |
| 9,619,473 B1 | 4/2017 | Chopra et al. | |
| 9,946,592 B2 | 4/2018 | Rasor et al. | |
| 9,996,477 B2 | 6/2018 | Chan et al. | |
| 10,360,156 B2 | 7/2019 | Yun et al. | |
| 10,635,324 B1 | 4/2020 | Klein et al. | |
| 11,086,745 B2 | 8/2021 | Mun et al. | |
| 2018/0239696 A1* | 8/2018 | Lim | G06F 3/0679 |
| 2019/0146696 A1* | 5/2019 | d'Abreu | G06F 3/0634 |
| | | | 711/154 |
| 2019/0155682 A1 | 5/2019 | Sinha et al. | |
| 2019/0278498 A1 | 9/2019 | Dedrick | |

FOREIGN PATENT DOCUMENTS

| | | |
|---|---|---|
| KR | 10-2018-0016679 A | 2/2018 |
| KR | 10-2020-0092103 A | 8/2020 |

* cited by examiner

*Primary Examiner* — Mardochee Chery
(74) *Attorney, Agent, or Firm* — Muir Patent Law, PLLC

(57) ABSTRACT

A storage device includes a communication circuit and a controller. The controller is configured to transmit log data to a host device through the communication circuit in response to receiving a first signal from the host device, receive a second signal, including an operation condition of an algorithm of the storage device, from the host device through the communication circuit, and change the operation condition of the algorithm on the basis of the second signal, wherein the algorithm includes one or more instructions for controlling an operation of the storage device.

20 Claims, 16 Drawing Sheets

FIG. 5

| Variable (NAND) | Value |
|---|---|
| Read Error Rate | a |
| Write Error Rate | b |
| Unrecoverable Write Errors | c |
| Read Recovery Attempts | d |
| ⋮ | ⋮ |

FIG. 6

```
{
    "NAND"{                                    ─ PLD1
        "Read Error Rate"          : 0,
        "Write Error Rate"         : 0,
        "Unrecoverable Write Errors" : 0,
        "Read Recovery Attempts"   : 10,
            ⋮
    }

"Performance"{                             ─ PLD2
        "Throughput Performance"   : 0,
        "Perf Indicator"           : 1,
            ⋮
    }

"Endurance"{                               ─ PLD3
        "Timed Workload Media"     : 16,
        "Lifetime NAND Writes"     : 2808,
        "Lifetime Wear level Cnt"  : 617,
            ⋮
    }

"Thermal"{                                 ─ PLD4
        "Highest Temperature"      : 131,
        "Lowest Temperature"       : 132,
        "Current Temperature"      : 130,
            ⋮
    }
}
```

FIG. 9

| Value | Description |
|-------|-------------|
| 0h | Default |
| 1h | Level 1 |
| 2h | Level 2 |
| 3h | Level 3 |
| ⋮ | ⋮ |

STORAGE DEVICE AND OPERATING METHOD THEREOF

CROSS-REFERENCE TO RELATED APPLICATION

This application is based on and claims priority under 35 U.S.C. § 119 to Korean Patent Application No. 10-2021-0127545, filed on Sep. 27, 2021, in the Korean Intellectual Property Office, the disclosure of which is incorporated by reference herein in its entirety.

BACKGROUND

1. Field

Embodiments relate to an electronic device, and more particularly, to a storage device and an operating method thereof.

2. Description of the Related Art

A representative example of a large-scale storage device based on flash memory is a solid state drive (SSD). The demand for SSDs has increased rapidly. SSDs should be managed and maintained to have high reliability and optimal service quality.

SUMMARY

Embodiments are directed to a storage device, including a communication circuit and a controller, wherein the controller is configured to transmit log data to a host device through the communication circuit in response to receiving a first signal from the host device, receive a second signal, including an operation condition of an algorithm of the storage device, from the host device through the communication circuit, and change the operation condition of the algorithm on the basis of the second signal, and the algorithm represents a code for controlling an operation of the storage device.

Embodiments are directed to an operating method of a storage device, the operating method including transmitting log data to a host device in response to receiving a first signal from the host device, receiving a second signal, including an operation condition of an algorithm of the storage device, from the host device, changing the operation condition of the algorithm on the basis of the second signal, wherein the algorithm represents a code for controlling an operation of the storage device.

Embodiments are directed to a host device, including a communication circuit and a controller, wherein the controller is configured to transmit a first signal, requesting log data, to a storage device through the communication circuit, receive the log data from the storage device through the communication circuit, determine an operation condition of an algorithm of the storage device, and transmit a second signal, including the determined operation condition of the algorithm, to the storage device through the communication circuit, wherein the algorithm represents a code for controlling an operation of the storage device.

BRIEF DESCRIPTION OF THE DRAWINGS

Features will become apparent to those of skill in the art by describing in detail example embodiments with reference to the attached drawings in which:

FIG. 5 is a diagram of data in a human readable format according to an example embodiment;

FIG. 6 is a diagram of details of data in a human readable format according to an example embodiment;

FIG. 9 is a diagram of details of data of a command provided by a host, according to an example embodiment;

DETAILED DESCRIPTION

Figure 1:
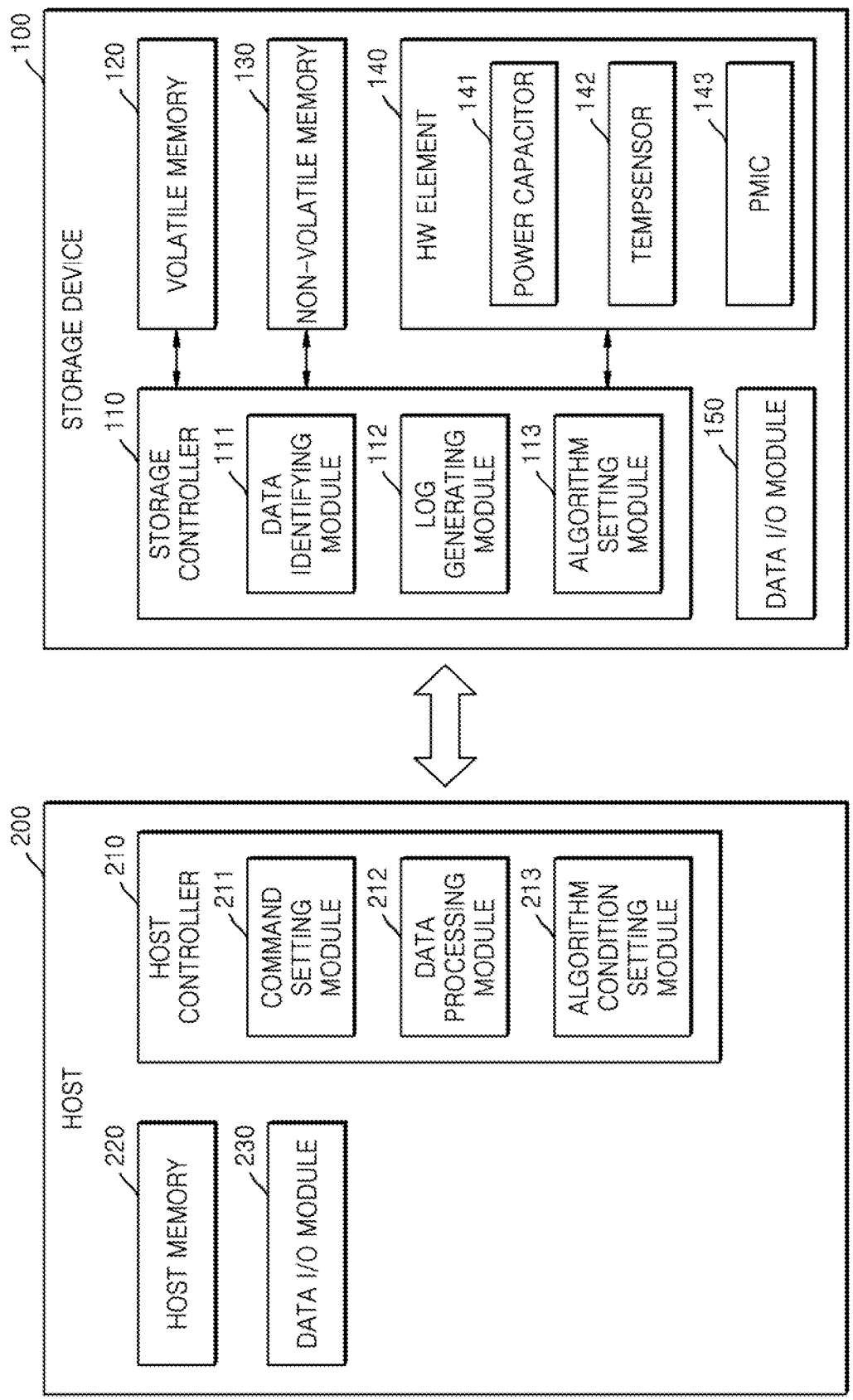
FIG. 1 is a diagram of a storage system according to an example embodiment.

FIG. 1 is a diagram of a storage system 10 according to an example embodiment.

Referring to FIG. 1, the storage system 10 may include a storage device 100 and a host 200.

The storage device 100 may be configured with a plurality of components. Each of the components may be implemented as hardware-based, implemented as software-based, and implemented with hardware and software, in the storage device 100. Herein, a component may be referred to as an element.

Referring to FIG. 1, e.g., the storage device 100 may include a storage controller 110, a volatile memory 120, a non-volatile memory 130, and a hardware element 140.

The storage device 100 may include a plurality of storage mediums for storing data in response to a request from the host 200. For example, the storage device 100 may include at least one of a solid state drive (SSD), an embedded memory, and an attachable/detachable external memory. When the storage device 100 is an SSD, the storage device 100 may be a device based on non-volatile memory express (NVMe) specifications. When the storage device 100 is an embedded memory or an external memory, the storage device 100 may be a device based on universal flash storage (UFS) specifications or embedded multi-media card (eMMC) specifications. Each of the host 200 and the storage device 100 may generate a packet based on an applied standard protocol and may transmit the packet.

The storage controller 110 may control an overall operation of the storage device 100. The storage controller 110 may be referred to as a controller, a device controller, or a memory controller.

When power is applied from the outside to the storage device 100, the storage controller 110 may execute firmware. When the non-volatile memory 130 is a flash memory device, the firmware may include a host interface layer (HIL), a flash translation layer (FTL), and a flash interface layer (FIL).

In response to a write request, a read request, and an erase request of the host 200, the storage controller 110 may control the volatile memory 120 or the non-volatile memory 130 to perform each of a program operation (or a write operation), a read operation, and an erase operation. In performing the program operation, the storage controller 110 may provide a program command, a physical address, and write data to the non-volatile memory 130. In performing the read operation, the storage controller 110 may provide a read command and a physical address to the non-volatile memory 130. In performing the erase operation, the storage controller 110 may provide an erase command and a physical address to the non-volatile memory 130.

The storage controller 110 may transfer, to the non-volatile memory 130, a command, an address, and data which are autonomously generated regardless of a request provided from the host 200. For example, the storage controller 110 may generate a command, an address, and data for performing a background operation, and may provide the generated command, address, and data to the non-volatile memory 130. The background operation may be, e.g., wear leveling, read reclaim, or garbage collection.

The storage controller 110 may control a plurality of non-volatile memories 130 which are logically operated as one non-volatile memory 130.

The storage controller 110 may transmit log data of the storage device 100 to the host 200 in response to a get log page command received from the host 200. The get log page command may include a command which issues a request to provide log data to the storage device 100.

The storage controller 110 may change an algorithm operation condition of the storage device 100 in response to a set features command received from the host 200. The set features command may include information about the algorithm operation condition of the storage device 100 determined by the host 200.

An algorithm may be, e.g., a code including one or more instructions for controlling an internal state of the storage device 100 and may include at least one of a first algorithm and a second algorithm. The first algorithm may denote an algorithm implemented with software, e.g., the first algorithm may include a software-based algorithm. The second algorithm may denote an algorithm implemented with hardware, e.g., the second algorithm may include a hardware-based algorithm.

The get log page command and the set features command may be defined in NVMe specifications. The get log page command will be described below in detail with reference to FIG. 3. The set features command will be described below in detail with reference to FIGS. 8 and 9.

The storage controller 110 may transmit, to the host 200, log data of at least one context selected from among a plurality of contexts, in response to the get log page command. The get log page command may include information representing a context associated with an algorithm. The storage controller 110 may change the algorithm operation condition of the storage device 100 in response to the set features command received from the host 200.

The storage controller 110 may include a data identifying module 111, a log generating module 112, and an algorithm setting module 113. The data identifying module 111, the log generating module 112, and the algorithm setting module 113 may be implemented with hardware, or may be implemented with hardware and software. The data identifying module 111, the log generating module 112, and the algorithm setting module 113 may be implemented with firmware.

The data identifying module 111 may generate context information in response to a log data request, received from the host 200, for the storage device 100. The data identifying module 111 may identify information about the algorithm operation condition received from the host 200.

The data identifying module 111 may select at least one context from among the plurality of contexts on the basis of information associated with an algorithm, and may generate context information about the selected context.

The log generating module 112 may generate the log data on the basis of the context information. The log generating module 112 may control the volatile memory 120 or the non-volatile memory 130 to store the generated log data.

The algorithm setting module 113 may change the algorithm operation condition of the storage device 100 on the basis of the information about the algorithm operation condition received from the host 200.

Referring to FIG. 1, the data identifying module 111, the log generating module 112, and the algorithm setting module 113 may be included in the storage controller 110. In another implementation, the data identifying module 111, the log generating module 112, and the algorithm setting module 113 may be included in a processor implemented independently from the storage controller 110.

The volatile memory 120 may operate in response to control by the storage controller 110 only while power is being supplied thereto. The volatile memory 120 may temporarily store data provided from the host 200, or data provided from the non-volatile memory 130, only while power is being supplied thereto. The volatile memory 120 may be a buffer memory, and may be included in the storage controller 110 or may be provided outside the storage controller 110. The volatile memory 120 may include dynamic random access memory (RAM) (DRAM), a static RAM (SRAM), etc.

The volatile memory 120 may store log data.

The non-volatile memory 130 may operate in response to control by the storage controller 110. In detail, the non-volatile memory 130 may receive a command and an address from the storage controller 110, and may access a memory cell selected from among memory cells (not shown) on the basis of the address. The non-volatile memory 130 may perform an operation, indicated by the received command, on the memory cell selected based on the received address. The command may include, e.g., a program command, a read command, or an erase command. The operation indicated by the command may include, e.g., a program operation (or a write operation), a read operation, or an erase operation. The program operation may be an operation of storing, by using the non-volatile memory 130, data provided from the host 200 in response to control by the storage controller 110. The read operation may be an operation of reading, by using the non-volatile memory 130, data stored in the non-volatile memory 130 in response to control by the storage controller 110. The erase operation may be an operation of erasing, by using the non-volatile memory 130, data stored in a memory device in response to control by the storage controller 110.

The non-volatile memory 130 may be implemented with a plurality of memory chips or a plurality of memory dies. Each of the plurality of memory chips may include a dual die package (DDP), a quadruple die package (QDP), or an octuple die package (ODP). The non-volatile memory 130 may include, e.g., flash memory. The flash memory may include, e.g., NAND flash memory, NOR flash memory, etc. When the non-volatile memory 130 includes flash memory, the flash memory may include a two-dimensional (2D) NAND memory array or a three-dimensional (3D) (or vertical) NAND (VNAND) memory array. The storage device 100 may include various other kinds of non-volatile memories, e.g., magnetic RAM (MRAM), spin transfer torque MRAM, conductive bridging RAM (CBRAM), ferroelectric RAM (FeRAM), phase RAM (PRAM), resistive RAM (ReRAM), etc.

The non-volatile memory 130 may store log data.

A plurality of non-volatile memories 130 may be provided, and a separate non-volatile memory 130 storing only log data among the plurality of non-volatile memories 130 may be provided in the storage device 100.

The hardware element 140 may include a power capacitor 141, a temperature sensor 142, and a power management integrated circuit (PMIC) 143.

The power capacitor 141 may store backup power.

The temperature sensor 142 may sense an internal temperature of the storage device 100.

The PMIC 143 may manage power supplied from the outside.

The host 200 may communicate with the storage device 100 through an interface. The interface may be implemented as, e.g., NVMe, NVMe management interface (MI), or NVMe over fabric (NVMeof).

The host 200 may provide the storage device 100 with a write request, which issues a request to store data in the storage device 100. The host 200 may provide the storage device 100 with the write request, data, and a logical address for identifying the data. In response to the write request provided from the host 200, the storage device 100 may store data provided by the host 200 and write data including metadata in the non-volatile memory 130, and may provide the host 200 with a response representing that storage is completed.

The host 200 may provide the get log page command to the storage device 100.

The host 200 may include a host controller 210, a host memory 220, and a data input/output (I/O) module 230.

The host controller 210 may control an overall operation of the host 200.

The host controller 210 may transmit the get log page command to the storage device 100. The host controller 210 may receive log data from the storage device 100, and may determine the algorithm operation condition of the storage device 100 by using the received log data. The host controller 210 may determine the algorithm operation condition of the storage device 100 on the basis of at least one of a selection of a user and an environment of the host 200.

The host controller 210 may transmit the set features command to the storage device 100.

The host controller 210 may select at least one context associated with an algorithm from among a plurality of contexts. The host controller 210 may transmit the get log page command, requesting the log data of the at least one context, to the storage device 100.

The host controller 210 may include a command setting module 211, a data processing module 212, and an algorithm condition setting module 213. The command setting module 211, the data processing module 212, and the algorithm condition setting module 213 may be implemented with hardware, or may be implemented with hardware and software. The command setting module 211, the data processing module 212, and the algorithm condition setting module 213 may also be implemented with firmware.

The command setting module 211 may generate a format of a command (e.g., the get log page command or the set features command) transmitted to the storage device 100.

The data processing module 212 may identify log data in a signal received from the storage device 100, and may perform processing on the log data. The data processing module 212 may obtain state information about the storage device 100 on the basis of the log data.

The algorithm condition setting module 213 may set an algorithm operation condition on the basis of a performance specification that is called for, based on an environment or a selection option of a user. The algorithm condition setting module 213 may perform machine learning on the log data to determine an optimized algorithm operation condition. The algorithm condition setting module 213 may determine the algorithm operation condition on the basis of at least one of the log data of the storage device 100 and a machine learning result corresponding to the log data.

The host memory 220 may function as a buffer memory for temporarily storing data, which is to be transferred to the storage device 100, and data transferred from the storage device 100.

The data I/O module 230 may transfer, to the storage device 100, data stored in the host memory 220 or data which is to be transferred to the storage device 100 or is to be stored in the host memory 220.

Figure 2:
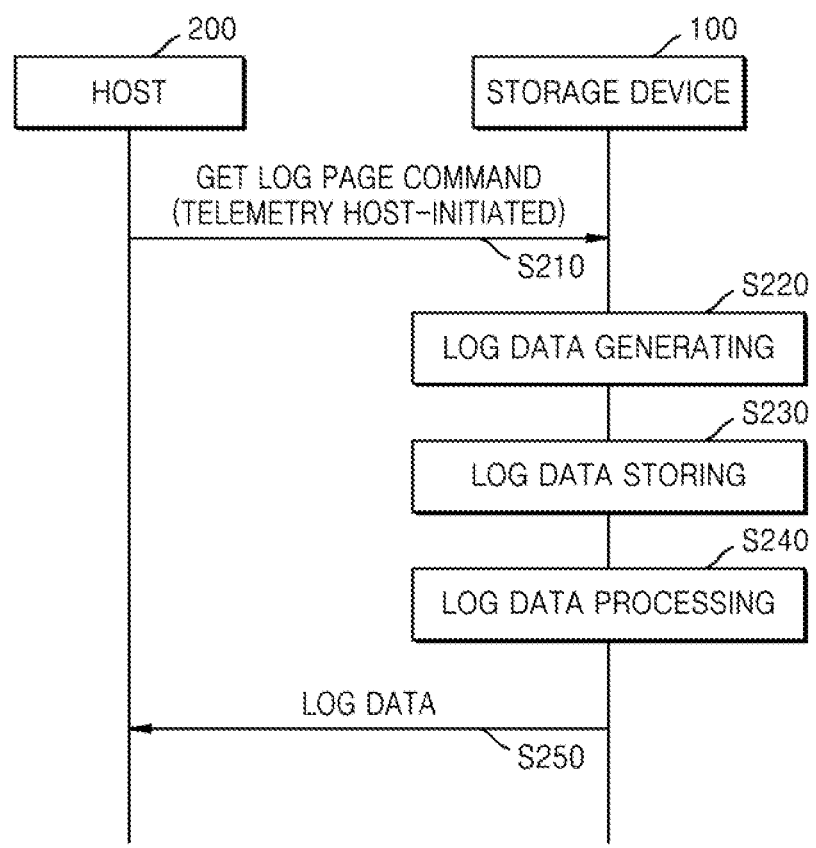
FIG. 2 is a diagram of an operating method of a storage system, according to an example embodiment.

FIG. 2 is a diagram of an operating method of a storage system, according to an example embodiment.

Referring to FIG. 2, in operation S210, the host 200 may transmit the get log page command to the storage device 100. Also, the storage device 100 may receive the get log page command. The get log page command may include bit information (or a bit value) corresponding to telemetry host-initiated. The telemetry host-initiated may represent that the host 200 starts telemetry. The telemetry host-initiated may be defined in NVMe specifications (e.g., 5.16.18 based on NVMe specifications 2.0a). The telemetry host-initiated will be described below with reference to FIG. 3. The get log page command may include a log data request for a state of the storage device 100 or information about a context associated with an algorithm.

In operation S220, the storage device 100 may snapshot the storage device 100 in response to the get log page command, thereby generating log data. For example, the storage device 100 may snapshot a context corresponding to an overall internal state of the storage device 100 to generate the log data. As another example, the storage device 100 may snapshot at least one context associated with an algorithm to generate the log data.

In operation S230, the storage device 100 may store the generated log data in a memory (e.g., the volatile memory 120 or the non-volatile memory 130).

In operation S240, the storage device 100 may load the stored log data, and may process the loaded log data so that a format of the loaded log data is converted into a human readable format.

In operation S250, the storage device 100 may transmit the log data to the host 200. That is, the storage device 100 may transmit the log data, loaded from the memory (e.g., the volatile memory 120 or the non-volatile memory 130), to the host 200. In this case, the storage device 100 may convert and transmit a format (e.g., a binary format) of the log data on the basis of a format supported by the host 200.

In operation S250, the host 200 may analyze an internal state of the storage device 100 on the basis of the transmitted log data. An operation of analyzing the internal state of the storage device 100 may include at least one of an operation of analyzing whether the performance of the storage device 100 is reduced, an operation of analyzing whether the performance of the storage device 100 matches a performance condition set by a user, and an operation of analyzing whether the performance of the storage device 100 matches an environment where the host 200 is disposed.

Figure 3:
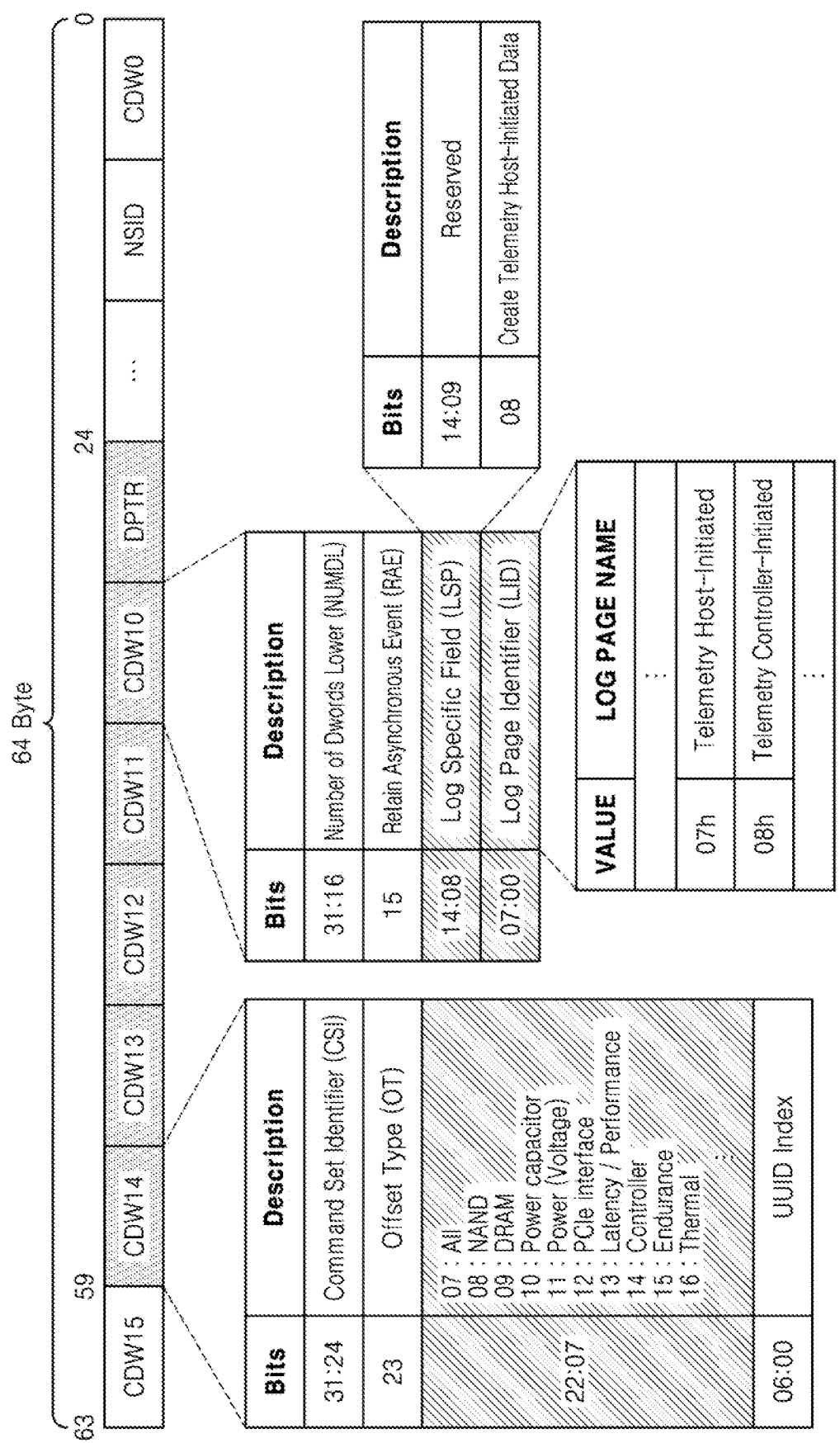
FIG. 3 is a diagram of a command provided by a host, according to an example embodiment.

FIG. 3 is a diagram of a command provided by a host, according to an example embodiment.

Referring to FIG. 3, a command (or a request) provided by the host 200 may include a command defined in NVMe specifications, and a command queue entry may include a submission queue entry defined in NVMe specifications. A size of the command provided by the host 200 may be 64 bytes. The command provided by the host 200 may include, e.g., sixteen command double words. One command double word may be data having a size of 4 bytes.

The command provided by the host 200 may include a command double word 0 CDW0 and a name space identifier (NSID).

The command provided by the host 200 may further include a data pointer DPTR, a command double word 10 CDW10, a command double word 11 CDW11, a command double word 12 CDW12, a command double word 13 CDW13, a command double word 14 CDW14, and a command double word 15 CDW15.

The get log page command provided by the host 200 may include a command to which NVMe specifications (e.g., 5.16 in NVMe specifications 2.0a) is applied. The get log page command provided by the host 200 may include a data pointer DPTR, a command double word 10 CDW10, a command double word 11 CDW11, a command double word 12 CDW12, a command double word 13 CDW13, and a command double word 14 CDW14.

The data pointer DPTR may be a field which designates data used in the command. The data pointer DPTR may be a field which designates a start point of a data buffer in the host memory 220.

The command double word 10 CDW10 may include number of dwords lower (NUMDL), retain asynchronous event (RAE), log specific field (LSP), and log page identifier (LID).

NUMDL may be a field which designates least significant 16 bits unless designated.

RAE may be a field which retains an asynchronous event or designates an erase time. and may have a size of 1 bit.

LSP may be a field which represents a log defined by LID. and may have a size of 7 bits.

LID may be a field which represents an identifier of a log page to be searched for. and may have a size of 8 bits.

LID may represent bit information corresponding to the telemetry host-initiated. The bit information corresponding to the telemetry host-initiated may be, e.g., "07h".

When LID includes the bit information corresponding to the telemetry host-initiated, LSP may include bit information that indicates generating of telemetry host-initiated data. A size of the bit information indicating generating of the telemetry host-initiated data may be 1 bit. For example, in a case which requests log data (e.g., the telemetry host-initiated data) corresponding to a state of the storage device 100, the host 200 may set a value of a bit of LSP to "1". When a value of a bit of LSP is identified as "1", the storage device 100 may generate the log data (e.g., the telemetry host-initiated data).

As another example, in a case which does not request the log data (e.g., the telemetry host-initiated data) corresponding to the state of the storage device 100, the host 200 may set a value of a bit of LSP to "0". When a value of a bit of LSP is identified as "0", the storage device 100 may not generate the log data (e.g., the telemetry host-initiated data).

The command double word 11 CDW11 may include a field that designates an identifier needed for a specific log page, and a field that designates least significant 16 bits unless designated.

The command double word 12 CDW12 may include a field designating a position at which data conversion is to be started in one log page unless designated.

The command double word 13 CDW13 may include a field designating most significant 32 bits of an index in a list of a data structure or a log page offset.

The command double word 14 CDW14 may include command set identifier CSI, offset type OT, selection information, and universally unique identifier (UUID) index UUID INDEX.

CSI may include bit information corresponding to an NVM command set, bit information corresponding to a key value command set, and bit information corresponding to a zoned namespace command set.

OT may have a first value or a second value. When OT has the first value, an index of a list of a data structure in a log page where the command double word 12 CDW12 and the command double word 13 CDW13 are to be converted may be designated. When OT has the second value, a byte offset in a log page where the command double word 12 CDW12 and the command double word 13 CDW13 are to be converted may be designated.

The host 200 may transmit the get log page command, and thus, may transmit, to the storage device 100, selection information about at least one context associated with an algorithm. The selection information may have a value of 16 bits. Each bit of the selection information may correspond to each of contexts of a plurality of components configuring the storage device 100. When a value of each bit of the selection information has a specific value (e.g., "1"), a context corresponding to the specific value may be selected. Based on selection information about the get log page command, the storage device 100 may identify the selected at least one context, and may generate log data of the at least one context.

Although not shown, the command provided by the host 200 may further include a command double word 2, a command double word 3, and a metadata pointer.

Figure 4:
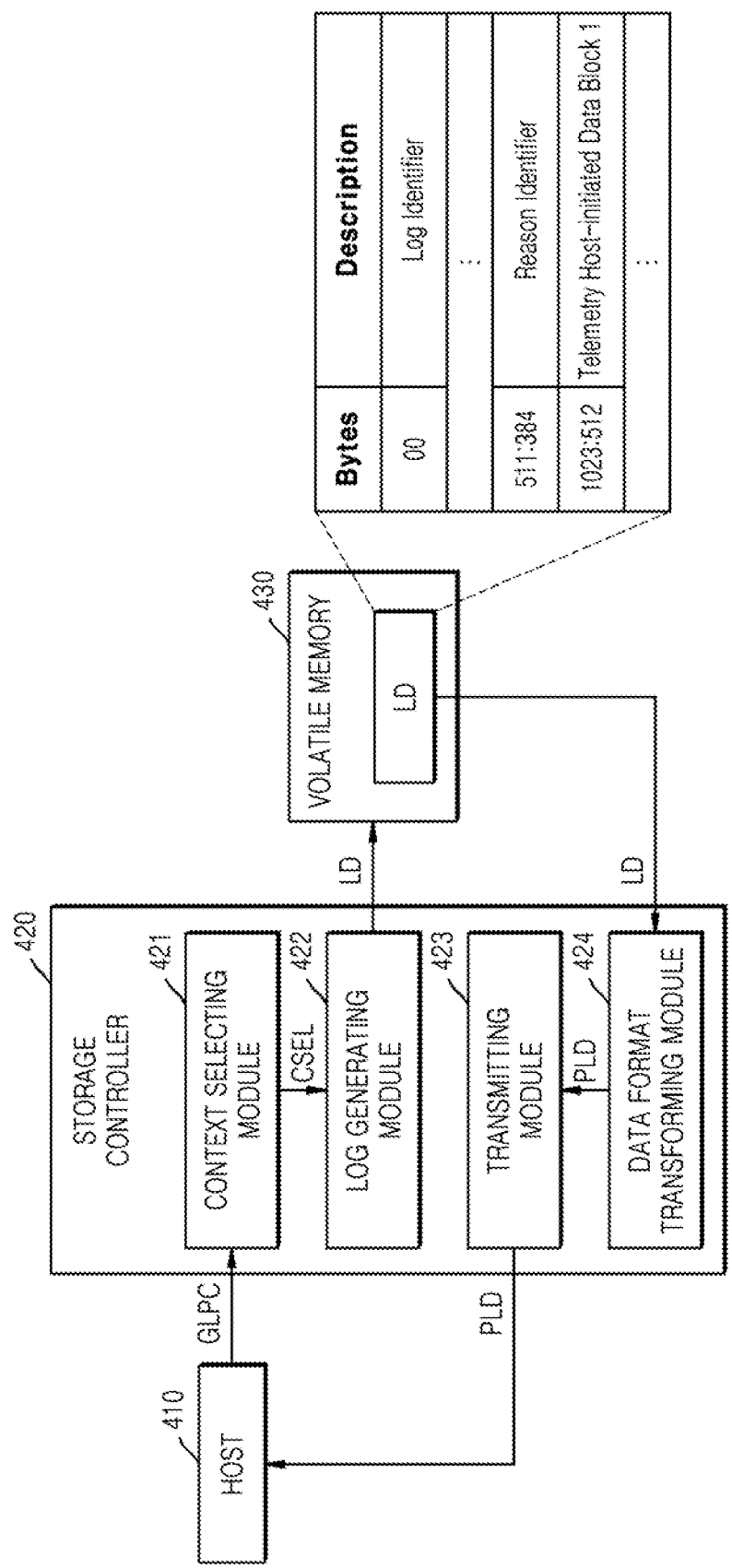
FIG. 4 is a diagram of operational elements of a storage system, according to an example embodiment.

FIG. 4 is a diagram of operational elements a storage system, according to an example embodiment.

Referring to FIGS. 3 and 4, a host 410 may perform the same function as that of the host 200 illustrated in FIG. 1. The host 410 may transmit a get log page command GLPC to the storage controller 420. The get log page command GLPC may include the command double word 14 CDW14 including selection information as illustrated in FIG. 3.

The storage controller 420 may include a context selecting module 421, a log generating module 422, a transmitting module 423, and a data format transforming module 424.

The context selecting module 421 may receive the get log page command GLPC. The context selecting module 421 may check a selected context by using the selection information included in the get log page command GLPC. The context selecting module 421 may provide the log generating module 422 with a context selection signal CSEL representing context information about a selected component.

The log generating module 422 may receive the context selection signal CSEL. The log generating module 422 may snapshot a current context (e.g., a time at which a first signal is received) of the selected component, and may generate log data LD representing the current context. The log generating module 422 may provide the log data LD, a write command, and an address to a volatile memory 430.

The log data LD may be stored in the volatile memory 430. The log data LD may include a log identifier representing a bit value of LID, a reason identifier representing identification information representing a unique operation condition of a storage controller, and a telemetry host-initiated data block 1 for a telemetry host-initiated log.

The data format transforming module 424 may control the volatile memory 430 to load the log data LD stored in the volatile memory 430. The data format transforming module 424 may transform the loaded log data LD into data of a portable readable format to process the log data LD. The data format transforming module 424 may output a processed log data PLD to the transmitting module 423.

The transmitting module 423 may transmit the processed log data PLD to the host 410. A size of the processed log data PLD may be less than that of log data corresponding to all contexts of the storage device 100.

As described above, log data of a selectively extracted context may be provided to a host, and thus, a data transmission size may be reduced, thereby increasing a transmission rate between the host and a storage device.

Also, as described above, log data having a smaller size may be transmitted to the host, and thus, latency occurring in the host may decrease.

FIG. 5 is a diagram of data of a human readable format according to an example embodiment.

Referring to FIGS. 3 and 5, it may be assumed that an eighth bit digit of selection information represents the non-volatile memory 130. Also, it may be assumed that a value of the eighth bit digit of the selection information has a certain value (e.g., "1"), and thus, the non-volatile memory 130 is selected.

The processed log data PLD may represent context information about the non-volatile memory 130. The context information may include a variable and a value. For example, the context information included in the processed log data PLD may include Read Error Rate having an a value, Write Error Rate having a b value, Nonrecoverable Write Errors having a c value, and Read Recovery Attempts having a d value.

The processed log data PLD may be data of a human readable format, and thus, a user may easily read the context information about the non-volatile memory 130.

FIG. 6 is a diagram of details of data of a human readable format according to an example embodiment.

Referring to FIG. 6, it may be assumed that first to fourth processed log data PLD1 to PLD4 are data of a human readable format and the human readable format is JSON. It may be assumed that the first processed log data PLD1 represents context information about NAND. It may be assumed that the second processed log data PLD2 represents context information about Performance (and/or Latency). It may be assumed that the third processed log data PLD3 represents context information about Endurance. It may be assumed that the fourth processed log data PLD4 represents context information about Thermal.

The user may easily read the context information about NAND from the first processed log data PLD1. In the first processed log data PLD1, a value of Read Error Rate may be 0, a value of Write Error Rate may be 0, a value of Unrecoverable Write Errors may be 0, and a value of Read Recovery Attempts may be 10.

The user may easily read the context information about Performance from the second processed log data PLD2. In the second processed log data PLD2, a value of Throughput Performance may be 0, and a value of Perf Indicator may be 0.

The user may easily read the context information about Endurance from the third processed log data PLD3. In the third processed log data PLD3, a value of Timed Workload Media may be 16, a value of Lifetime NAND writes may be 2808, and a value of Lifetime Wear Level Cnt may be 617.

The user may easily read the context information about Thermal from the fourth processed log data PLD4. In the fourth processed log data PLD3, a value of Highest Temperature may be 131, a value of Lowest Temperature may be 131, and a value of Current Temperature may be 130.

As described above, log data of a human readable format may be provided to a host, and thus, a user may easily analyze a state of a storage device.

Also, as described above, the user may analyze the state of the storage device by using the log data of the human readable format, and thus, may previously recover an error of the storage device, thereby improving the reliability of the storage device.

Figure 7:
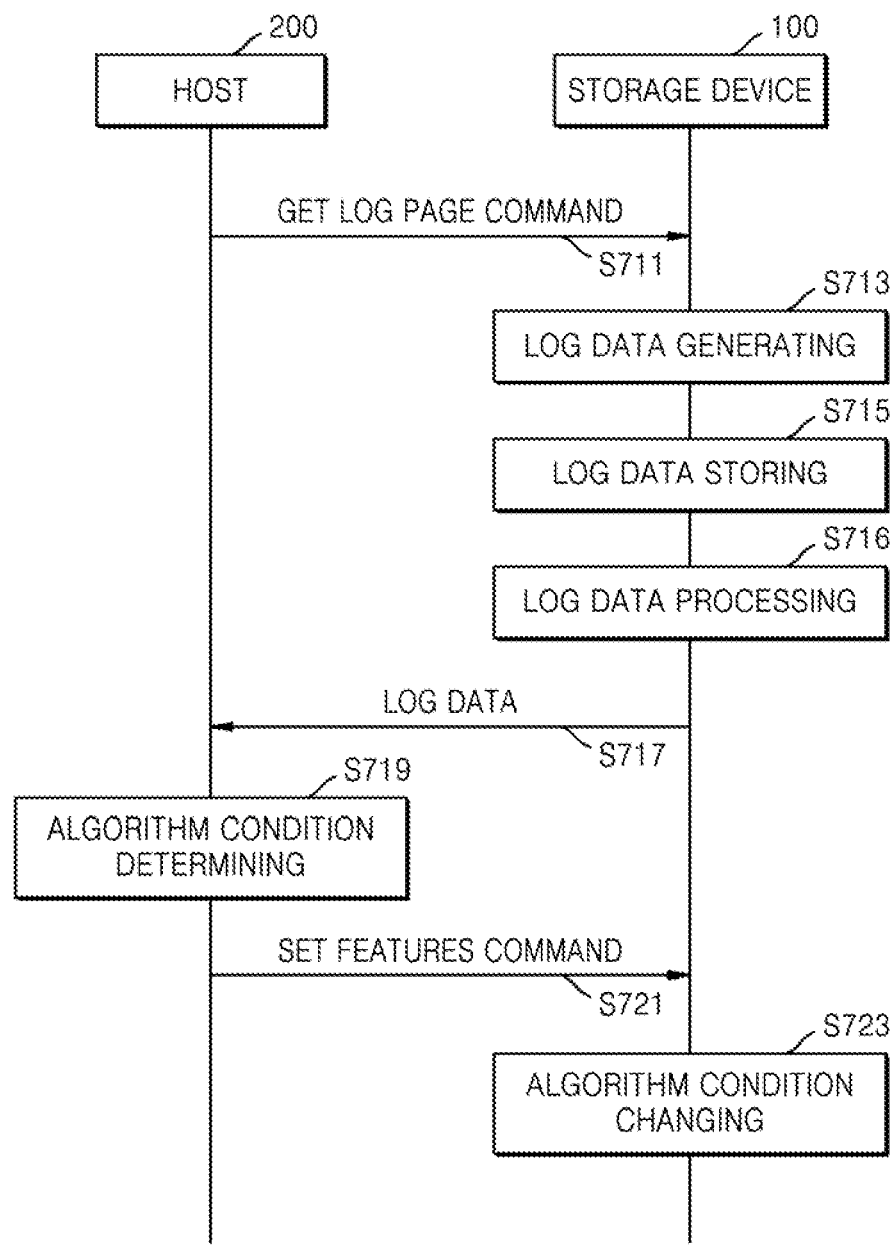
FIG. 7 is a diagram of an operating method of a storage system, according to an example embodiment.

FIG. 7 is a diagram of an operating method of a storage system, according to an example embodiment.

Referring to FIG. 7, in operation S711, the host 200 may transmit a get log page command to the storage device 100. Also, the storage device 100 may receive the get log page command. The get log page command, as described above with reference to FIG. 2, may include bit information corresponding to telemetry host-initiated. The get log page command, as described above with reference to FIG. 2, may include information about a context associated with an algorithm or a log data request for an overall state of the storage device 100.

In operation S713, the storage device 100 may snapshot a context of the storage device 100 in response to the get log page command, thereby generating log data. For example, the storage device 100 may snapshot a context corresponding to an overall internal state of the storage device 100 to generate the log data. As another example, the storage device 100 may snapshot at least one context associated with an algorithm to generate the log data.

In operation S715, the storage device 100 may store the generated log data in a memory (e.g., the volatile memory 120 or the non-volatile memory 130).

In operation S716, the storage device 100 may load the stored log data, and may process the loaded log data so that a format of the loaded log data is converted into a human readable format.

In operation S717, the storage device 100 may transmit the log data to the host 200. That is, the storage device 100 may transmit the log data, loaded from the memory (e.g., the volatile memory 120 or the non-volatile memory 130), to the host 200. In this case, the storage device 100 may convert and transmit a format (e.g., a binary format) of the log data on the basis of a format supported by the host 200.

In operation S719, the host 200 may set an algorithm operation condition of the storage device 100 on the basis of the transmitted log data. The host 200 may analyze an internal operation state of the storage device 100 on the basis of the transmitted log data, and may set the algorithm operation condition of the storage device 100 by using an analysis result. For example, the host 200 may set the algorithm operation condition on the basis of at least one of a performance option that is selected or set by a user and an environment of the host 200.

In operation S721, the host 200 may transmit a set features command to the storage device 100. Also, the storage device 100 may receive the set features command. The set features command may include bit information (or a bit value) corresponding to the set algorithm operation condition. The set features command will be described below in detail with reference to FIGS. 8 and 9. The set features command may be defined in NVMe specifications (e.g., 5.27 based on NVMe specifications 2.0a).

In operation S723, the storage device 100 may change the algorithm operation condition in response to the received set features command. An algorithm may be a code for controlling an operation of a storage device and may include an algorithm (e.g., patrol read and background media scan) implemented with software and an algorithm (e.g., error correction code) implemented with hardware. An algorithm will be described below in detail with reference to FIG. 8.

Figure 8:
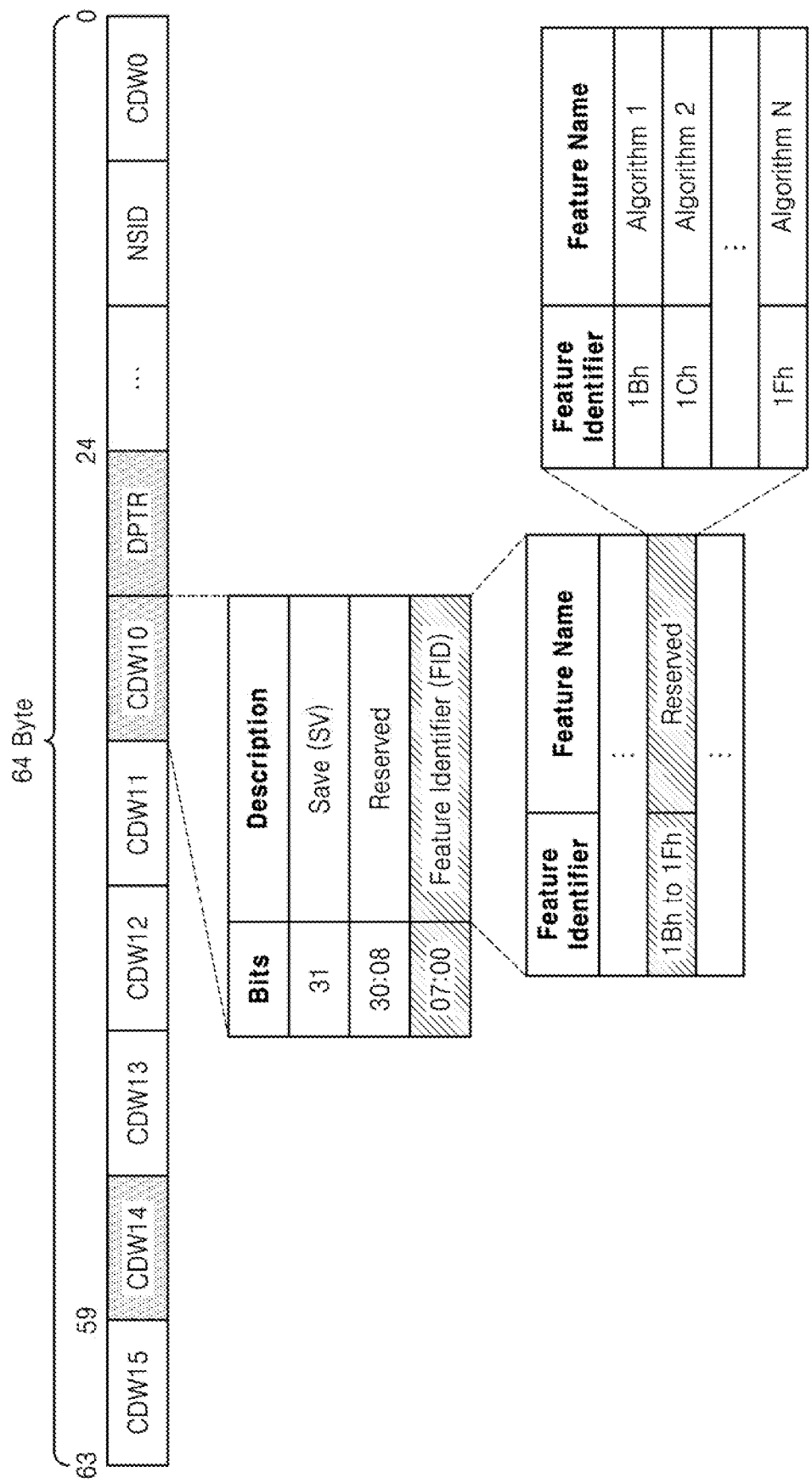
FIG. 8 is a diagram of a command provided by a host, according to an example embodiment.

FIG. 8 is a diagram of a command provided by a host, according to an example embodiment.

Referring to FIG. 8, a command (or a request) provided by the host 200 may include a command defined in NVMe specifications, and a command queue entry may include a submission queue entry defined in NVMe specifications. A size of the command provided by the host 200 may be 64 bytes. The command provided by the host 200 may include, e.g., sixteen command double words. One command double word may be data having a size of 4 bytes.

The command provided by the host 200 may include a command double word 0 CDW0 and a name space identifier (NSID).

The command provided by the host 200 may further include a data pointer DPTR, a command double word 10 CDW10, a command double word 11 CDW11, a command double word 12 CDW12, a command double word 13 CDW13, a command double word 14 CDW14, and a command double word 15 CDW15.

The set features command provided by the host 200 may include a command to which NVMe specifications (e.g., 5.27 in NVMe specifications 2.0a) is applied. The set features command provided by the host 200 may include a data pointer DPTR, a command double word 10 CDW10, and a command double word 14 CDW14.

The data pointer DPTR may be a field which designates data used in the command. The data pointer DPTR may be a field which designates a start point of a data buffer in the host memory 220.

The command double word 10 CDW10 may include save SV and feature identifier FID. SV may be a field indicating performance in a state where a power state or a reset event occurs, and may have a size of 1 bit. FID may be a field representing an identifier of an attribute included in a command which is to be set, and may have a size of 8 bits.

FID may represent bit information corresponding to an algorithm of the storage device 100 set in the host 200. When the algorithm of the storage device 100 set in the host 200 is a first algorithm, bit information corresponding to the first algorithm may be, e.g., "1Bh". The first algorithm may be a code for controlling an operation of a storage device and may include an algorithm (e.g., patrol read and background media scan) implemented with software.

A patrol read algorithm may be executed when the storage device 100 is in an active state. The patrol read algorithm may denote an algorithm which searches for a weak page having reduced retention performance among sampling pages of blocks of a memory on the basis of a physical address and controls the storage device 100 to perform reclaim on the found weak page.

The weak page may denote a page where an error bit (e.g., an uncorrectable error correction code (UECC)) has a threshold value or more, among a plurality of pages of the memory.

The reclaim may denote an operation which is performed in a weak page, where the UECC occurs, and which moves data, stored in the weak page, from a source block to a destination block.

The patrol read algorithm may perform control to periodically perform scan on the basis of a predetermined scan interval. The scan interval may denote a time interval from previous scan to next scan, and may be determined based on the following Equation 1:

$$\text{scan interval} = \frac{\{(\text{numberf of sampling pages}) \times (\text{number of used blocks})\}}{\text{scan period}} \quad \text{[Equation 1]}$$

As described above, as the patrol read algorithm is performed, performance may be prevented from being reduced by retention reduction in a memory.

A background media scan algorithm may search for a weak page of a memory of the storage device 100 on the basis of a logical address array, and may control the storage device 100 to perform reclaim, when the storage device 100 is in an idle state.

The background media scan algorithm may be constructed to perform sequential media scan by page units without interleaving. Also, in order to decrease a total scan time in the idle state, the background media scan algorithm may sequentially scan the weak page without a scan interval.

The background media scan algorithm may scan the weak page by predefined scan units (e.g., 16 KB/(LBA size) of the background media scan algorithm. The scan unit may denote the amount of data that is scanned in performing scan once, and may be determined based on the following Equation 2:

$$\text{scan unit} = \frac{\{\text{size of page}\}}{\{\text{logical block array size}\}} \quad \text{[Equation 2]}$$

For example, when an LBA unit is 4 KB, background media scan may be performed on the weak page by scan units "LBA4n" (where n is a positive integer of 0 or more).

When a scan operation is stopped by an internal/external factor, the patrol read algorithm and the background media scan algorithm may be constructed to store LBA/Block of a finally scanned target, and to perform scan from the stored LBA/Block in restarting.

As described above, the patrol read algorithm and the background media scan algorithm may be performed, and thus, may prevent a reduction in performance caused by UECC which occurs due to a complex reliability problem of the memory.

Also, as described above, as the patrol read algorithm and the background media scan algorithm are performed, an experience of a user may be improved by controlling a storage device to quickly perform reclaim.

When the algorithm of the storage device 100 set in the host 200 is a second algorithm, bit information corresponding to the second algorithm may be, e.g., "1Ch". The second algorithm may be a code for controlling an operation of a storage device, and may represent an algorithm (e.g., an error correction code) implemented with hardware.

An error correction code algorithm may detect damage of data occurring in performing an operation (e.g., read, write, transmit, and store) in the storage device 100, and may control the storage device 100 to physically recover the damaged data.

As described above, an error correction code algorithm may be executed, thereby enhancing the reliability of data of a memory.

The command double word 14 CDW14 may include a universally unique identifier (UUID) index UUID INDEX corresponding to a general-use unique identifier in a distributed computing environment.

The host 200 may transmit the set features command, and thus, may transmit information including a set algorithm operation condition to the storage device 100. The storage device 100 may identify an algorithm associated with the information received from the host 200, and may change an operation condition of a corresponding algorithm on the basis of the received information.

Although not shown, the command provided by the host 200 may further include a command double word 2, a command double word 3, and a metadata pointer.

FIG. 9 is a diagram of details of data of a command provided by a host, according to an example embodiment.

Referring to FIG. 9, it may be assumed that an identifier of FID of a set features command has a certain value (e.g., "1Bh"), and thus, a storage device 100 algorithm 1 (e.g., a first algorithm) is selected. Also, it may be assumed that a certain value is input to a field corresponding to an identifier of FID, and thus, an operation condition of the storage device 100 algorithm 1 is set.

The set features command may represent information about an algorithm operation condition of the storage device 100, which is to be set by the host 200. The information about the algorithm operation condition may include a variable and a value. The information about the algorithm operation condition may include a default having a "0h" value, a level 1 having a "1h" value, a level 2 having a "2h" value, and a level 3 having a "3h" value. A level may incrementally implement the algorithm operation condition, and may be determined based on a performance spec needed based on an environment or a selection option of a user.

Figure 10:
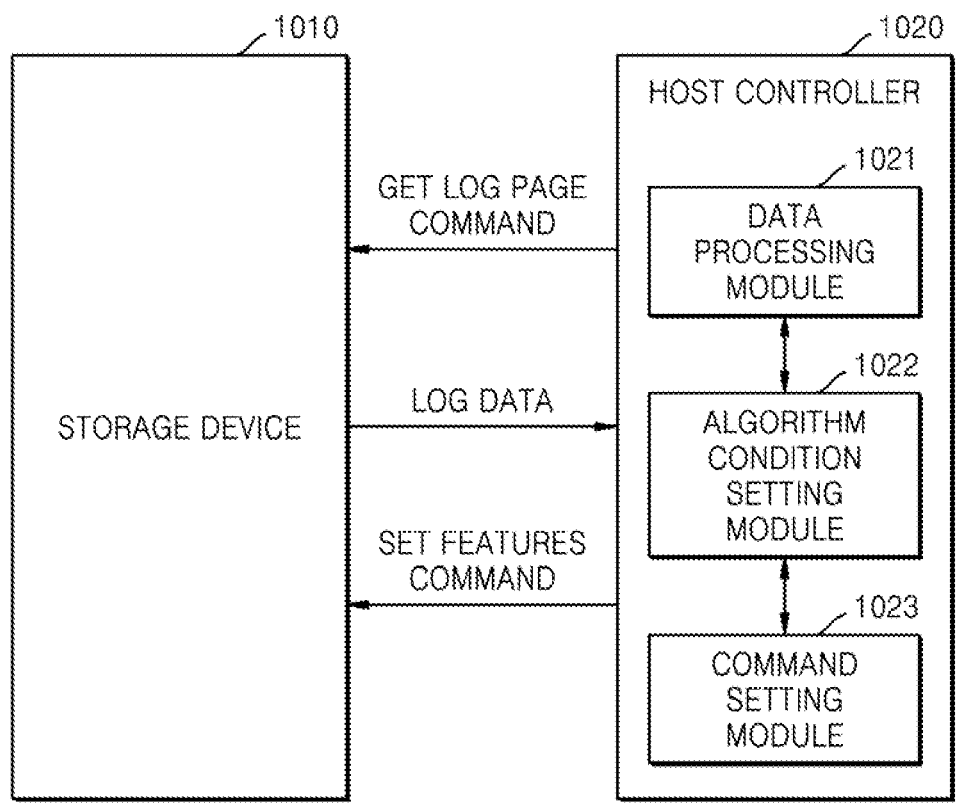
FIG. 10 is a diagram of an operating method of a host, according to an example embodiment.

FIG. 10 is a diagram of an operating method of a host, according to an example embodiment.

Referring to FIGS. 3 and 10, a storage device 1010 may perform the same function as that of the storage device 100 illustrated in FIG. 1. A host controller 1020 may transmit a get log page command to the storage device 1010. The get log page command may include request information about at least one of overall log data of an internal state of the storage device 1010 and log data associated with an algorithm operation condition. The get log page command, as illustrated in FIG. 3, may include a command double word 10 CDW10 and a command double word 14 CDW14, each including the request information.

The host controller 1020 may include a data processing module 1021, an algorithm condition setting module 1022, and a command setting module 1023.

The data processing module 1021 may receive log data from the storage device 100 in response to the get log page command. The data processing module 1021 may identify log data in a signal received from the storage device 100, and may perform processing on the log data. The data processing module 1021 may obtain state information about the storage device 100 on the basis of the log data. The state information may include at least one of an erase count per block of the storage device 100, the number of data write, the number of bad blocks in a solid state drive (SSD), an error rate per block, the number of blocks having an error correction code (ECC) state, and information about a device temperature.

The algorithm condition setting module 1022 may set an algorithm operation condition on the basis of a performance specification needed based on an environment or a selection option of a user. The algorithm condition setting module 1022 may perform machine learning on the log data to determine an optimized algorithm operation condition. The algorithm condition setting module 1022 may determine the algorithm operation condition on the basis of at least one of the log data of the storage device 100 and a machine learning result corresponding to the log data.

Referring to FIGS. 8, 9, and 10, the command setting module 1023 may generate a format of a command transmitted to the storage device 100. The command setting module 1023 may generate a format of a set features command on the basis of information about the determined algorithm operation condition. The set features command may include identifier information about an algorithm and operation condition information about a corresponding algorithm. The set features command, as illustrated in FIGS. 8 and 9, may include a command double word 10 CDW10 including the identifier information and the operation condition information.

Although not shown in FIG. 10, a data I/O module of the host 200 may transmit the set features command to the storage device 1010.

As described above, by adaptively changing an algorithm operation condition on the basis of log data of the storage device 1010, a device may be controlled to match a performance spec needed based on an environment or a selection option of a user.

Also, as described above, the device may be controlled through processing based on the log data of the storage device 1010 in a normal operation state, and thus, the technical use of the log data of the storage device 1010 may increase.

Figure 11:
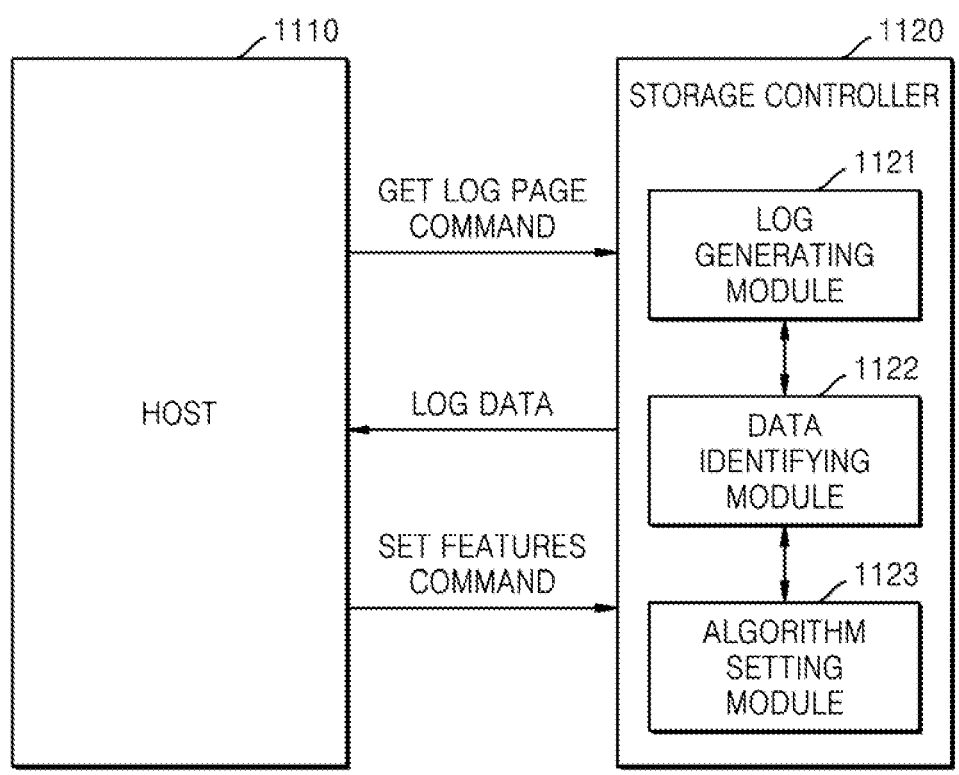
FIG. 11 is a diagram of an operating method of a storage system, according to an example embodiment.

FIG. 11 is a diagram of an operating method of a storage system, according to an example embodiment.

Referring to FIGS. 3 and 11, a host 1110 may perform the same function as that of the host 200 illustrated in FIG. 1. A storage controller 1120 may receive a get log page command from the host 1110. The get log page command may include request information about at least one of overall log data of an internal state of the storage device 1010 and log data associated with an algorithm operation condition. The get log page command, as illustrated in FIG. 3, may include a command double word 10 CDW10 and a command double word 14 CDW14, each including the request information.

The storage controller 1120 may include a log generating module 1121, a data identifying module 1122, and an algorithm setting module 1123.

The log generating module 1121 may snapshot a current context (e.g., a context at a time at which a first signal is received) of the storage device 100, and may generate log data representing the current context, in response to the get log page command. The log data may include at least one of an erase count per block, the number of data writes, the number of bad blocks in an SSD, an error rate per block, the number of blocks having an ECC state, and information about a device temperature. The log generating module 1121 may control the volatile memory 120 or the non-volatile memory 130 to store the generated log data. Although not shown in FIG. 11, the log generating module 1121 may transmit the stored log data to the host 1110 through the data I/O module.

The data identifying module 1122 may identify data of the algorithm operation condition on the basis of a set features command received from the host 1110.

As described above with reference to FIGS. 8 and 9, the set features command may include information about the algorithm operation condition of the storage device 100, which is to be set by the host 200. The algorithm operation condition may be incrementally implemented based on a level, and a level of the algorithm operation condition may be determined based on a performance specification needed based on an environment or a selection option of a user. The set features command, as illustrated in FIG. 8, may include the command double word 10 CDW10 including information about the algorithm operation condition. The data identifying module 1122 may identify the algorithm operation condition and the kind of an algorithm set in the host 1110 on the basis of a bit value of a certain field in the set features command.

The algorithm setting module 1123 may change the algorithm operation condition of the storage device 100 on the basis of the information about the algorithm operation condition received from the host 200. An algorithm may be an algorithm for controlling an internal state of the storage device 100, and may include at least one of a hardware algorithm (e.g., an error correction code) and a software algorithm (e.g., patrol read and background media scan).

As described above, by adaptively changing an algorithm operation condition on the basis of log data of the storage device 100, a device may be controlled to match a performance spec needed based on an environment or a selection option of a user.

Also, as described above, the device may be controlled through processing based on the log data of the storage device 100 in a normal operation state, and thus, the technical use of the log data of the storage device 100 may increase.

Figure 12:
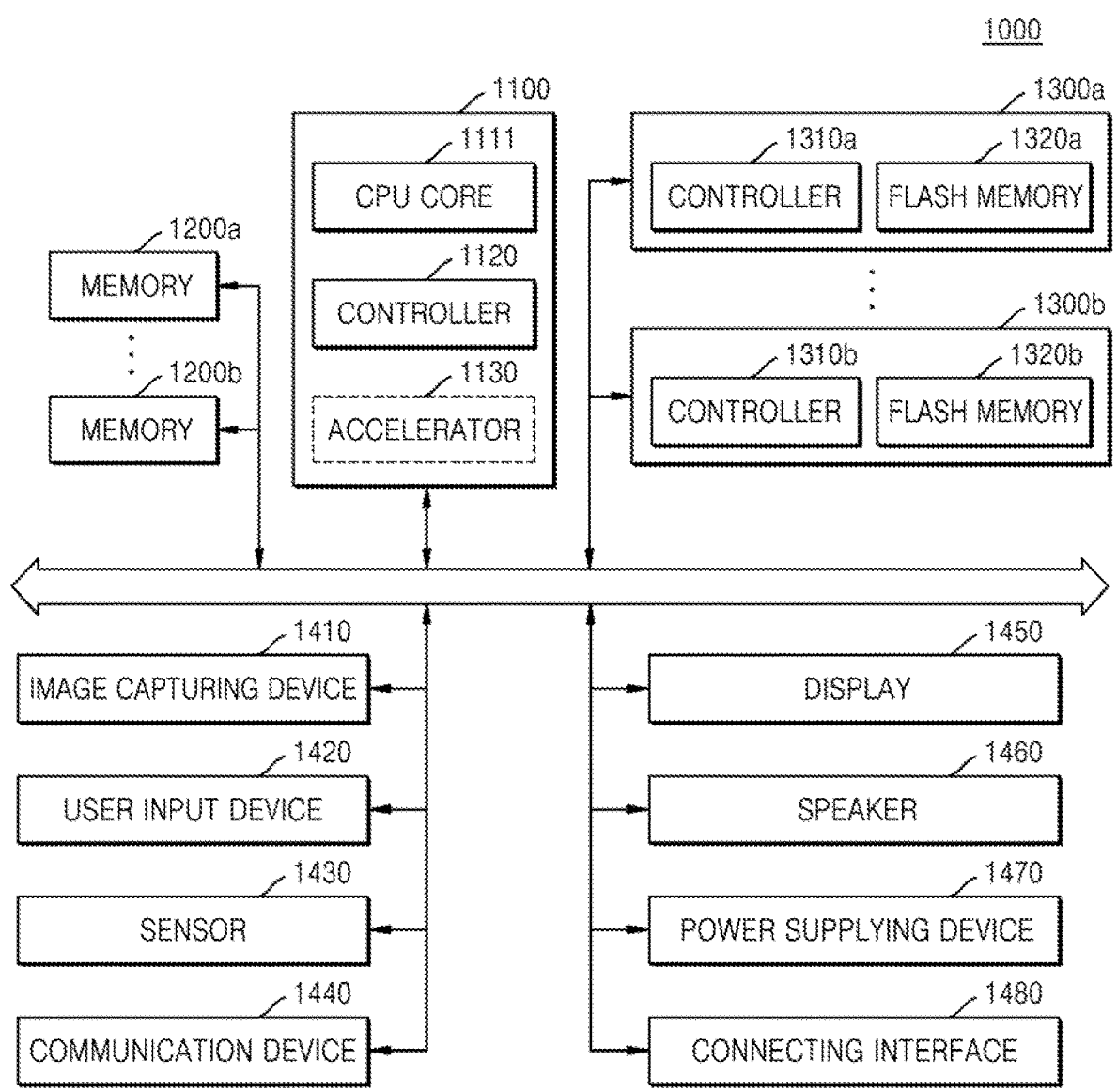
FIG. 12 is a block diagram illustrating a system including a storage device according to an example embodiment.

FIG. 12 is a block diagram illustrating a system 1000 to which a storage device according to an example embodiment is applied.

Referring to FIG. 12, the system 1000 may be or include a mobile system such as a portable phone, a smartphone, a tablet personal computer (PC), a wearable device, a healthcare device, an Internet of things (IoT) device, an automotive device, as a personal computer, a laptop computer, a server, a media player, a navigation device, etc.

The system 1000 may include a main processor 1100, a plurality of memories 1200a and 1200b, a plurality of storage devices 1300a and 1300b, and one or more of an image capturing device 1410, a user input device 1420, a sensor 1430, a communication device 1440, a display 1450, a speaker 1460, a power supplying device 1470, and a connecting interface 1480.

The main processor 1100 may control an overall operation of the system 1000, and more particularly, may control operations of other elements configuring the system 1000. The main processor 1100 may be implemented as a general-use processor, a dedicated processor, or an application processor. The main processor 1100 may include one or more central processing unit (CPU) cores 1111, the storage controller 1120 for controlling the memories 1200a and 1200b and/or the storage devices 1300a and 1300b, and an accelerator 1130, which is a dedicated circuit for performing a high-speed data operation such as an artificial intelligence (AI) data operation. The accelerator 1130 may include a graphics processing unit (GPU), a neural processing unit (NPU), and/or a data processing unit (DPU). and may be implemented as a separate chip which is physically independent of other elements of the main processor 1100.

The memories 1200a and 1200b may be used as a main memory device of the system 1000, and may include SRAM and/or DRAM, but may also include a non-volatile memory such as flash memory, PRAM, and/or ReRAM. The memories 1200a and 1200b may be implemented in the same package as the main processor 1100.

Each of the storage devices 1300a and 1300b may function as a non-volatile storage device that stores data regardless of the supply of power, and may have a storage capacity which is relatively greater than that of each of the memories 1200a and 1200b. The storage devices 1300a and 1300b may respectively include storage controllers 1310a and 1310b and non-volatile memories (NVM) 1320a and 1320b, which store data on the basis of control by the storage controllers 1310a and 1310b. The non-volatile memories 1320a and 1320b may include flash memory having a 2D or 3D VNAND structure, or may include a different kind of non-volatile memory such as PRAM or ReRAM.

The storage devices 1300a and 1300b may be included in the system 1000 while being physically apart from the main processor 1100, or may be implemented in the same package as the main processor 1100. The storage devices 1300a and 1300b may have a type such as an SSD or a memory card, and thus, may be detachably coupled to the other elements of the system 1000 through an interface such as the connecting interface 1480 (which is described in further detail, below). Each of the storage devices 1300a and 1300b may be a device to which specifications such as UFS, eMMC, or NVMe is applied.

The image capturing device 1410 may capture a still image or a moving image, and may include a camera, a camcorder, and/or a webcam.

The user input device 1420 may receive various types of data input from a user of the system 1000, and may include a touch pad, a keypad, a keyboard, a mouse, and/or a microphone.

The sensor 1430 may sense various types of physical amounts capable of being obtained from the outside of the system 1000, and may convert the sensed physical amount into an electrical signal. The sensor 1430 may include a temperature sensor, a pressure sensor, an illumination sensor, a position sensor, an acceleration sensor, a biosensor, and/or a gyroscope sensor.

The communication device 1440 may transmit and receive a signal between other devices outside the system 1000 on the basis of various communication protocols. The communication device 1440 may be implemented with an antenna, a transceiver, and/or a modem.

The display 1450 and the speaker 1460 may function as output devices which output visual information and audible information to the user of the system 1000, respectively.

The power supplying device 1470 may appropriately transform power supplied from an external power source and/or a battery (not shown) embedded into the system 1000 and may supply the power to each elements of the system 1000.

The connecting interface 1480 may provide a connection between the system 1000 and an external device that is connected to the system 1000 and transmits and receives data to and from the system 1000. The connecting interface 1480 may be implemented as various interface types such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, universal serial bus (USB), secure digital (SD) card, multi-media card (MMC), eMMC, UFS, embedded universal flash storage (eUFS), and compact flash (CF).

Figure 13:
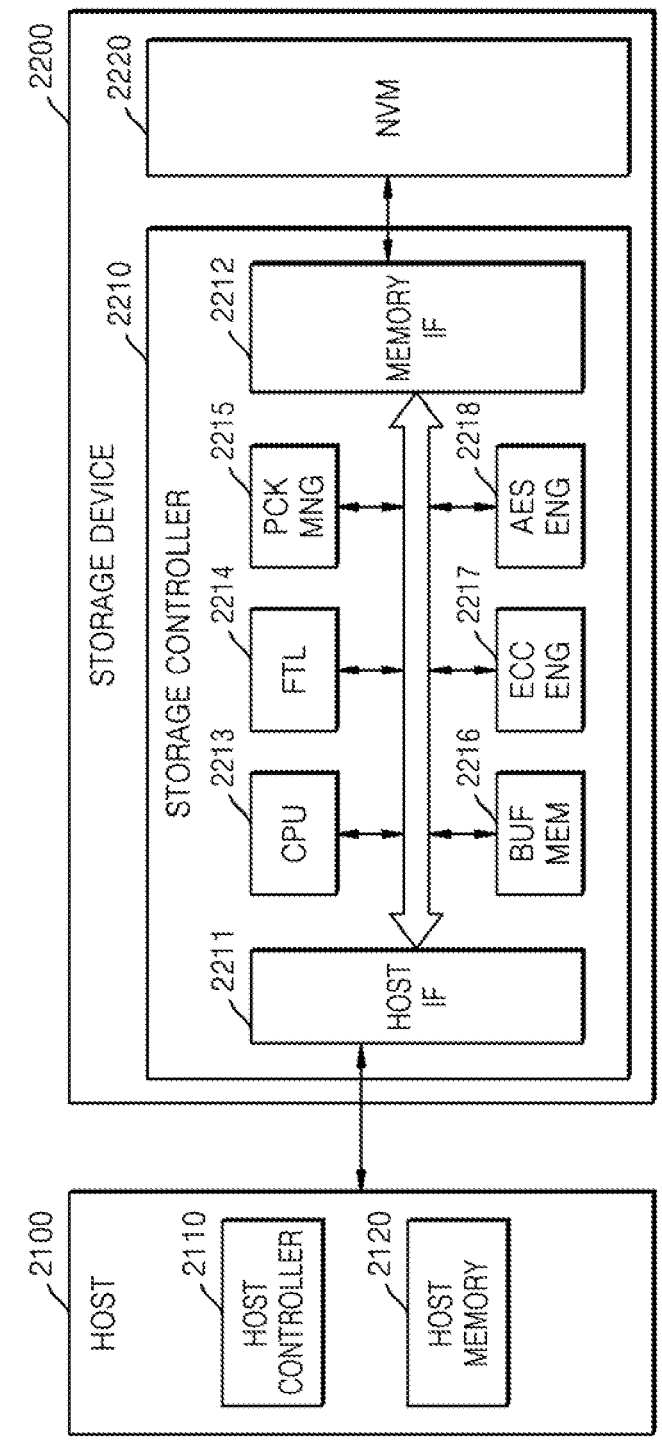
FIG. 13 is a block diagram illustrating a storage system according to another example embodiment.

FIG. 13 is a block diagram illustrating a storage system 2000 according to another example embodiment.

Referring to FIG. 13, the storage system 2000 may include a host 2100 and a storage device 2200.

The host 2100 may include a host controller 2110 and a host memory 2120. The host memory 2120 may function as a buffer memory for temporarily storing data, which is to be transferred to the storage device 2200, and data transferred from the storage device 2200.

The storage device 2200 may include a storage controller 2210 and a non-volatile memory (NVM) 2220. The storage device 2200 may include storage mediums for storing data on the basis of a request from the host 2100. For example, the storage device 2200 may include at least one of an SSD, an embedded memory, and an attachable/detachable external memory. When the storage device 2200 is an SSD, the storage device 2200 may be a device based on NVMe specifications. When the storage device 2200 is an embedded memory or an external memory, the storage device 2200 may be a device based on UFS specifications or eMNIC specifications. Each of the host 2100 and the storage device 2200 may generate a packet based on an applied standard protocol, and may transmit the packet.

When the non-volatile memory 2220 of the storage device 2200 includes flash memory, the flash memory may include a 2D NAND memory array or a 3D VNAND memory array. As another example, the storage device 2200 may include various other kinds of non-volatile memories. For example, the storage device 2200 may include MRAM, spin transfer torque MRAM, CBRAM, FeRAM, PRAM, ReRAM, and various other kinds of memories.

The host controller 2110 and the host memory 2120 may be implemented as separate semiconductor chips, or the host controller 2110 and the host memory 2120 may be integrated into the same semiconductor chip. The host controller 2110 may include one of various modules included in an application processor, and the application processor may be implemented as a system on chip (SoC). The host memory 2120 may include an embedded memory included in the application processor, or may include a non-volatile memory or a memory module, which is disposed outside the application processor.

The host controller 2110 may store data of a buffer region of the host memory 2120 in the non-volatile memory 2220, or may manage an operation of storing data of the non-volatile memory 2220 (e.g., read data) in the buffer region.

The storage controller 2210 may include a host interface 2211, a memory interface 2212, a CPU 2213, a flash translation layer (FTL) 2214, a packet manager 2215, a buffer memory 2216, an ECC engine 2217, and an advanced encryption standard (AES) engine 2218. The storage controller 2210 may further include a working memory (not shown) into which the FTL 2214 is loaded. A write operation and a read operation on the non-volatile memory 2220 may be controlled by the CPU 2213 executing the FTL 2214.

The host interface 2211 may transmit and receive a packet to and from the host 2100. A packet transmitted from the host 2100 to the host interface 2211 may include a command or data which is to be stored in the non-volatile memory 2220, and a packet transmitted from the host interface 2211 to the host 2100 may include a response to the command or data read from the non-volatile memory 2220. The memory interface 2212 may transmit the data, which is to be stored in the non-volatile memory 2220, to the non-volatile memory 2220 or may receive the data read from the non-volatile memory 2220. The memory interface 2212 may be implemented to observe specifications such as toggle or an open NAND flash interface (ONFI).

The FTL 2214 may perform various functions such as address mapping, wear-leveling, and garbage collection. An address mapping operation may be an operation of changing a logical address, received from the host 2100, to a physical address used to store data in the non-volatile memory 2220. The wear-leveling may be technology for preventing an excessive degradation in certain block by uniformly using blocks of the non-volatile memory 2220, and for example, may be implemented based on firmware technology for balancing erase counts of physical blocks. The garbage collection may be technology for securing an available capacity in the non-volatile memory 2220 on the basis of a manner which copies valid data of a block to a new block and erases a previous block.

The packet manager 2215 may generate a packet based on a protocol of an interface affiliated with the host 2100, or may parse various information from a packet received from the host 2100.

The buffer memory 2216 may temporarily store data, which is to be stored in the non-volatile memory 2220, or data which is to be read from the non-volatile memory 2220. The buffer memory 2216 may be an element included in the storage controller 2210, or may be disposed outside the storage controller 2210.

The ECC engine 2217 may perform an error detection and correction function on read data read from the non-volatile memory 2220. In more detail, the ECC engine 2217 may generate parity bits corresponding to write data which is to be stored in the non-volatile memory 2220, and the generated parity bits and the write data may be stored in the non-volatile memory 2220. In reading data from the non-volatile memory 2220, the ECC engine 2217 may correct an error of the read data by using parity bits which are read from the non-volatile memory 2220 along with the read data and may output read data where the error has been corrected.

The AES engine 2218 may perform at least one of an encryption operation and a decryption operation on data input to the storage controller 2210 by using a symmetric-key algorithm.

Figure 14:
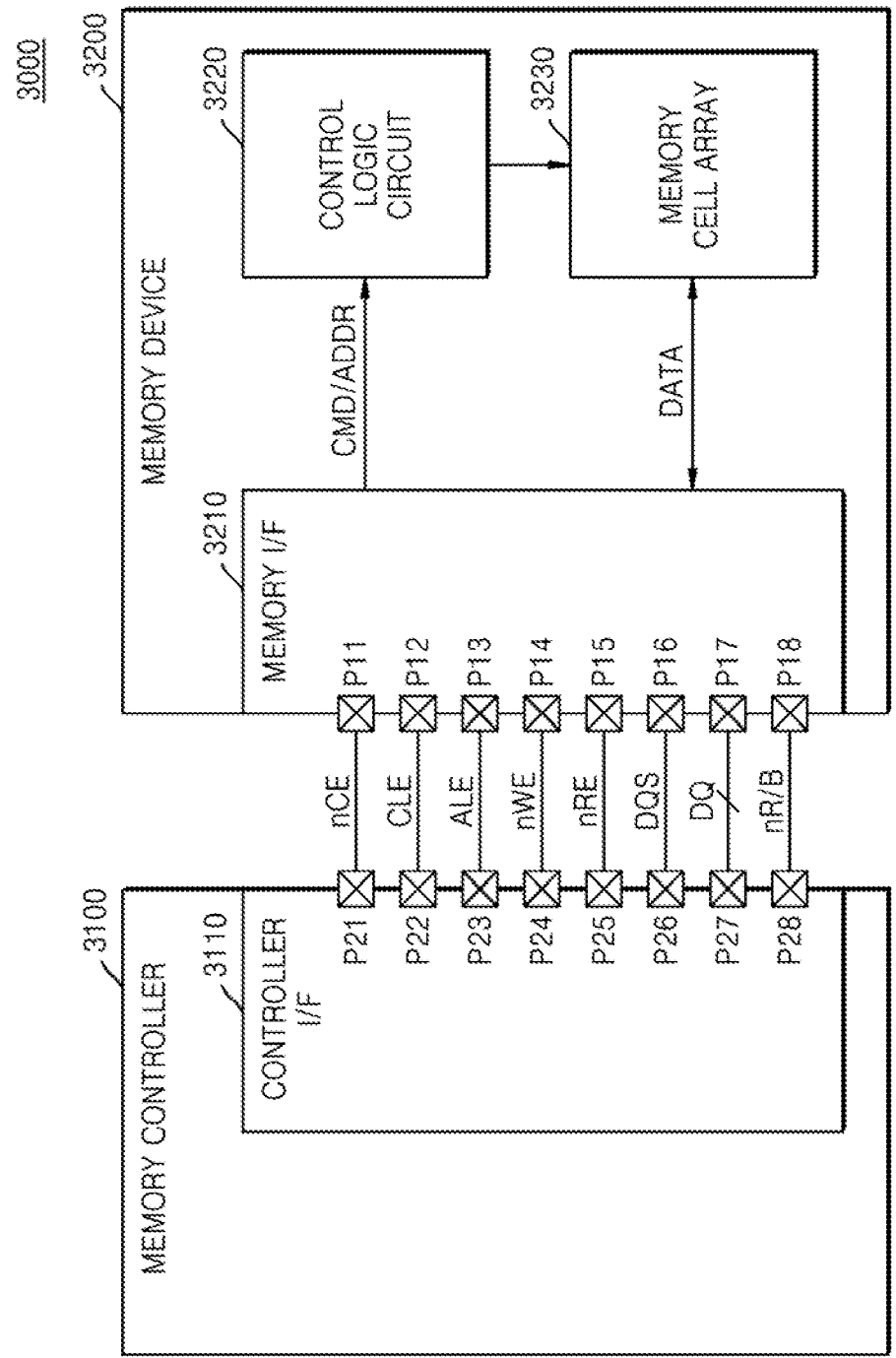
FIG. 14 is a block diagram illustrating a memory system according to an example embodiment.

FIG. 14 is a block diagram illustrating a memory system 3000 according to another example embodiment.

Referring to FIG. 14, the memory system 3000 may include a memory device 3200 and a memory controller 3100. The memory device 3200 may correspond to one of non-volatile memory devices communicating with the memory controller 3100 on the basis of one of a plurality of channels.

The memory device 3200 may include first to eighth pins P11 to P18, a memory interface circuit 3210, a control logic circuit 3220, and a memory cell array 3230.

The memory interface circuit 3210 may receive a chip enable signal nCE from the memory controller 3100 through the first pin P11. The memory interface circuit 3210 may transmit and receive signals to and from the memory controller 3100 through the second to eighth pins P12 to P18 on the basis of the chip enable signal nCE. For example, when the chip enable signal nCE is in an enable state (e.g., a low level), the memory interface circuit 3210 may transmit and receive the signals to and from the memory controller 3100 through the second to eighth pins P12 to P18.

The memory interface circuit 3210 may receive a command latch enable signal CLE, an address latch enable signal ALE, and a write enable signal nWE from the memory controller 3100 through the second to fourth pins P12 to P14. The memory interface circuit 3210 may receive a data signal DQ from the memory controller 3100 through the seventh pin P17, or may transmit the data signal DQ to the memory controller 3100. A command CMD, an address ADDR, and data DATA may be transferred through the data signal DQ. For example, the data signal DQ may be transferred through a plurality of data signal lines. In this case, the seventh pin P17 may include a plurality of pins corresponding to a plurality of data signals.

The memory interface circuit 3210 may obtain the command CMD from the data signal DQ received in an enable period (e.g., a high level state) of a command latch enable signal CLE on the basis of toggle timings of a write enable signal nWE. The memory interface circuit 3210 may obtain the address ADDR from the data signal DQ received in an enable period (e.g., a high level state) of an address latch enable signal ALE on the basis of the toggle timings of the write enable signal nWE.

The write enable signal nWE may maintain a static state (e.g., a high level or a low level) and then may toggle between a high level and a low level. For example, the write enable signal nWE may toggle in an interval where the command CMD or the address ADDR is transmitted. Therefore, the memory interface circuit 3210 may obtain the command CMD or the address ADDR on the basis of the toggle timings of the write enable signal nWE.

The memory interface circuit 3210 may receive a read enable signal nRE from the memory controller 3100 through the fifth pin P15. The memory interface circuit 3210 may receive a data strobe signal DQS from the memory controller 3100 through the sixth pin P16, or may transmit the data strobe signal DQS to the memory controller 3100.

In an operation of outputting the data DATA of the memory device 3200, the memory interface circuit 3210 may receive the read enable signal nRE toggling through the fifth pin P15 before outputting the data DATA. The memory interface circuit 3210 may generate the data strobe signal DQS toggling on the basis of toggling of the read enable signal nRE. For example, the memory interface circuit 3210 may generate the data strobe signal DQS which starts to toggle after predetermined delay (e.g., tDQSRE) with respect to a toggling start time of the read enable signal nRE. The memory interface circuit 3210 may transmit the data signal DQ including the data DATA on the basis of a toggle timing of the data strobe signal DQS. Therefore, the data DATA may be aligned with the toggle timing of the data strobe signal DQS and may be transmitted to the memory controller 3100.

In a data input operation of the memory device 3200, when the data signal DQ including the data DATA is received from the memory controller 3100, the memory interface circuit 3210 may receive the data strobe signal DQS, toggling along with the data DATA, from the memory controller 3100. The memory interface circuit 3210 may transmit the data DATA from the data signal DQ on the basis of the toggle timing of the data strobe signal DQS. For example, the memory interface circuit 3210 may sample the data signal DQ at a rising edge and a falling edge of the data strobe signal DQ to obtain the data DATA.

The memory interface circuit 3210 may transmit a ready/busy output signal nR/B to the memory controller 3100 through the eighth pin P18. The memory interface circuit 3210 may transmit state information about the memory device 3200 to the memory controller 3100 by using the ready/busy output signal nR/B. When the memory device 3200 is in a busy state (i.e., when internal operations of the memory device 3200 are being performed), the memory interface circuit 3210 may transmit the ready/busy output signal nR/B, representing the busy state, to the memory controller 3100. When the memory device 3200 is in a ready state (i.e., when internal operations of the memory device 3200 are not performed or are completed), the memory interface circuit 3210 may transmit the ready/busy output signal nR/B, representing the ready state, to the memory controller 3100. For example, while the memory device 3200 is reading the data DATA from the memory cell array 3230 in response to a page read command, the memory interface circuit 3210 may transmit the ready/busy output signal nR/B, representing the busy state (e.g., a low level), to the memory controller 3100. For example, while the memory device 3200 is programming the data DATA in the memory cell array 3230 in response to a program command, the memory interface circuit 3210 may transmit the ready/busy output signal nR/B, representing the busy state, to the memory controller 3100.

The control logic circuit 3220 may overall control various operations of the memory device 3200. The control logic circuit 3220 may receive a command/address CMD/ADDR obtained from the memory interface circuit 3210. The control logic circuit 3220 may generate control signals for controlling other elements of the memory device 3200 on the basis of the received command/address CMD/ADDR. For example, the control logic circuit 3220 may program the data DATA in the memory cell array 3230, or may generate various control signals for reading the data DATA from the memory cell array 3230.

The memory cell array 3230 may store the data DATA obtained from the memory interface circuit 3210 on the basis of control by the control logic circuit 3220. The memory cell array 3230 may output the stored data DATA to the memory interface circuit 3210 on the basis of control by the control logic circuit 3220.

The memory cell array 3230 may include a plurality of memory cells. For example, the plurality of memory cells may include flash memory cells. However, the memory cells may include an RRAM cell, an FRAM cell, a PRAM cell, a thyristor RAM (TRAM) cell, and a magnetic RAM (MRAM) cell. Hereinafter, an embodiment where memory cells are NAND flash memory cells will be mainly described.

The memory controller 3100 may include first to eighth pins P21 to P28 and a controller interface circuit 3110. The first to eighth pins P21 to P28 may correspond to the first to eighth pins P11 to P18 of the memory device 3200, respectively. The controller interface circuit 3110 may transmit the chip enable signal nCE from the memory device 3200 through the first pin P21. The controller interface circuit 3110 may transmit and receive signals to and from the memory device 3200, selected based on the chip enable signal nCE, through the second to eighth pins P22 to P28.

The controller interface circuit 3110 may transmit the command latch enable signal CLE, the address latch enable signal ALE, and the write enable signal nWE to the memory device 3200 through the second to fourth pins P22 to P24. The controller interface circuit 3110 may transmit the data signal DQ to the memory device 3200 through the seventh pin P27, or may receive the data signal DQ from the memory device 3200.

The controller interface circuit 3110 may transmit the data signal DQ, including the command CMD or the address ADDR, to the memory device 3200 along with the toggling write enable signal nWE. The controller interface circuit 3110 may transmit the data signal DQ including the command CMD to the memory device 3200 by transmitting the command latch enable signal CLE having an enable state, and may transmit the data signal DQ including the address ADDR to the memory device 3200 by transmitting the address latch enable signal ALE having an enable state.

The controller interface circuit 3110 may transmit the read enable signal nRE from the memory device 3200 through the fifth pin P25. The controller interface circuit 3110 may receive the data strobe signal DQS from the memory device 3200 through the sixth pin P26, or may transmit the data strobe signal DQS to the memory device 3200.

In an operation of outputting the data DATA of the memory device 3200, the controller interface circuit 3110 may generate the read enable signal nRE toggling and may transmit the read enable signal nRE to the memory device 3200. For example, the controller interface circuit 3110 may generate the read enable signal nRE changed from a static state (e.g., a high level or a low level) to a toggling state before the data DATA is output. Therefore, the memory device 3200 may generate the data strobe signal DQS toggling on the basis of the read enable signal nRE. The controller interface circuit 3110 may receive the data signal DQ, including the data DATA, from the memory device 3200 along with the data strobe signal DQS toggling. The controller interface circuit 3110 may transmit the data DATA from the data signal DQ on the basis of the toggle timing of the data strobe signal DQS.

In a data input operation of the memory device 3200, the controller interface circuit 3110 may generate the data strobe signal DQS toggling. For example, the controller interface circuit 3110 may generate the data strobe signal DQS changed from a static state (e.g., a high level or a low level) to a toggling state before the data DATA is transmitted. The controller interface circuit 3110 may transmit the data signal DQ, including the data DATA, to the memory device 3200 on the basis of toggle timings of the data strobe signal DQS. The controller interface circuit 3110 may transmit the ready/busy output signal nR/B from the memory device 3200 through the eighth pin P28. The controller interface circuit 3110 may determine state information about the memory device 3200 on the basis of the ready/busy output signal nR/B.

Figure 15:
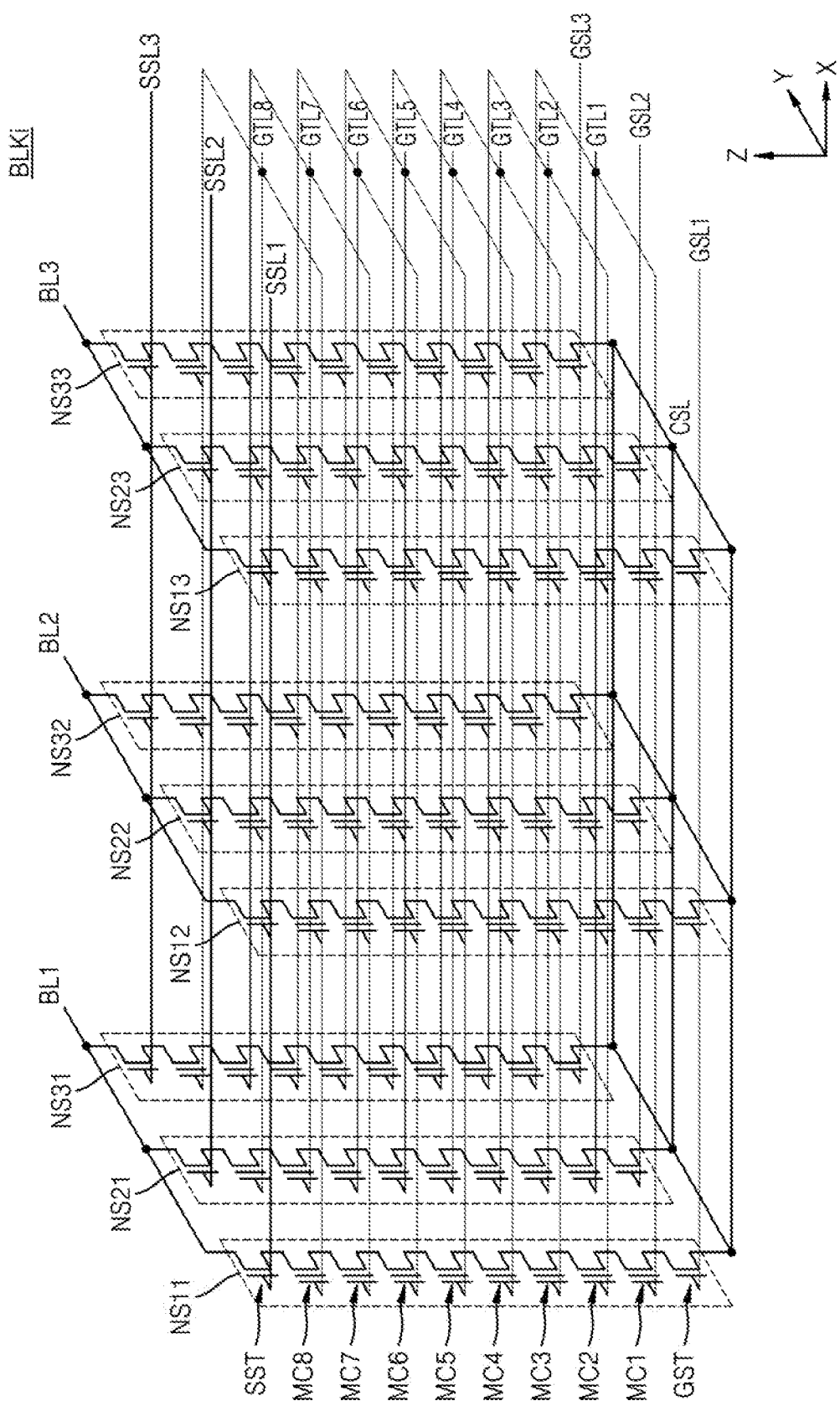
FIG. 15 is a diagram of a three-dimensional (3D) VNAND structure according to an example embodiment.

FIG. 15 is a diagram of a 3D VNAND structure according to an example embodiment.

Referring to FIG. 15, in a case where a non-volatile memory is implemented as a 3D VNAND type of flash memory, each of a plurality of memory blocks configuring a storage module may be referred to as an equivalent circuit illustrated in FIG. 15. A memory block BLKi may represent a 3D memory block formed in a 3D structure on a substrate. For example, a plurality of memory NAND strings included in the memory block BLKi may be formed in a direction vertical to the substrate.

The memory block BLKi may include a plurality of memory NAND strings NS11 to NS33 connected between bit lines BL1 to BL3 and a common source line CSL. Each of the plurality of memory NAND strings NS11 to NS33 may include a string selection transistor SST, a plurality of memory cells MC1, MC2, . . . , MC8, and a ground selection transistor GST. In FIG. 15, each of the plurality of memory NAND strings NS11 to NS33 is illustrated as including eight memory cells MC1 to MC8.

The string selection transistor SST may be connected to corresponding string selection lines SSL1 to SSL3. The plurality of memory cells MC1 to MC8 may be respectively connected to corresponding gate lines GTL1 to GTL8. The gate lines GTL1 to GTL8 may correspond to word lines, and some of the gate lines GTL1 to GTL8 may correspond to dummy word lines. The ground selection transistor GST may be connected to corresponding ground selection lines GSL1 to GSL3. The string selection transistor SST may be connected to corresponding bit lines BL1 to BL3, and the ground selection transistor GST may be connected to the common source line CSL.

A word line (e.g., WL1) having the same height may be connected in common, and the ground selection lines GSL1 to GSL3 and the string selection lines SSL1 to SSL3 may be apart from one another. In FIG. 15, it is illustrated that a memory block BLK is connected to eight gate lines GTL1 to GTL8 and three bit lines BL1 to BL3.

Figure 16:
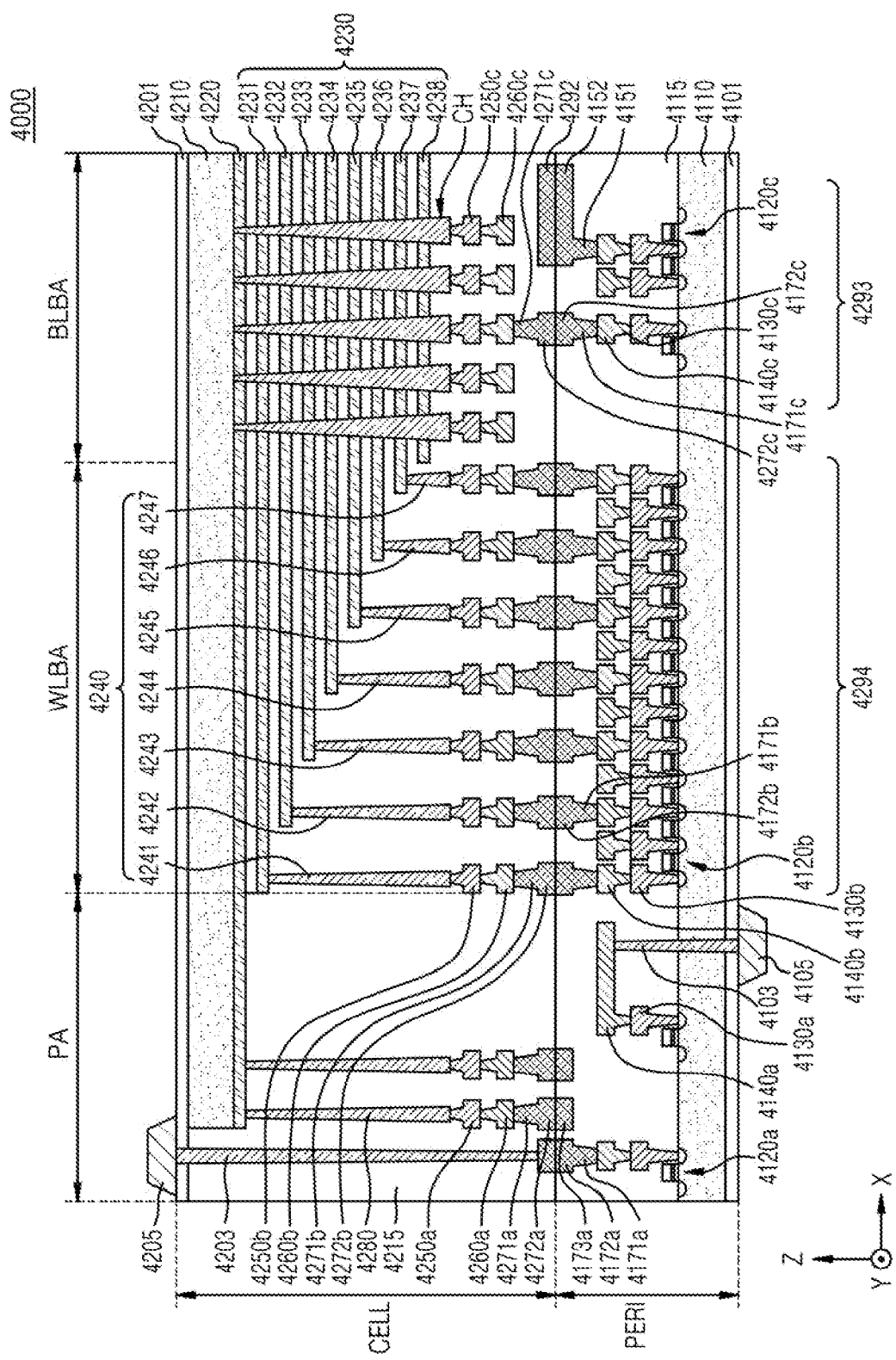
FIG. 16 is a diagram of a BVNAND structure according to an example embodiment.

FIG. 16 is a diagram of a BVNAND structure according to an example embodiment.

Referring to FIG. 16, when a non-volatile memory is implemented as a bonding vertical NAND (BVNAND) type of flash memory, the non-volatile memory may have a structure illustrated in FIG. 16.

A memory device 4000 may have a chip to chip (C2C) structure. The C2C structure may denote that an upper chip including a cell region CELL is manufactured on a first wafer, a lower chip including a peripheral circuit region PERI is manufactured on a second wafer which differs from the first wafer, and the upper chip is connected to the lower chip by a bonding manner. For example, the bonding manner may denote a manner where a bonding metal formed in an uppermost metal layer of the upper chip is electrically connected to a bonding metal formed in an uppermost metal layer of the lower chip. For example, when a bonding metal includes copper (Cu), the bonding manner may be a Cu—Cu bonding manner, and the bonding metal may include aluminum or tungsten.

Each of the peripheral circuit region PERI and the cell region CELL of the memory device 4000 may include an external pad bonding region PA, a word line bonding region WLBA, and a bit line bonding region BLBA.

The peripheral circuit region PERI may include a first substrate 4110, an interlayer insulation layer 4115, a plurality of circuit devices 4120*a*, 4120*b*, and 4120*c* formed in the first substrate 4110, a plurality of first metal layers 4130*a*, 4130*b*, and 4130*c* respectively connected to the plurality of circuit devices 4120*a*, 4120*b*, and 4120*c*, and a plurality of second metal layers 4140*a*, 4140*b*, and 4140*c* respectively connected to the plurality of first metal layers 4130*a*, 4130*b*, and 4130*c*. In an embodiment, the first metal layers 4130*a*, 4130*b*, and 4130*c* may include tungsten which is relatively high in resistance, and the second metal layers 4140*a*, 4140*b*, and 4140*c* may include copper which is relatively low in resistance.

Herein, only the first metal layers 4130*a*, 4130*b*, and 4130*c* and the second metal layers 4140*a*, 4140*b*, and 4140*c* are illustrated and described, but one or more metal layers may be further formed on the second metal layers 4140*a*, 4140*b*, and 4140*c*. At least some of the one or more metal layers formed on the second metal layers 4140*a*, 4140*b*, and 4140*c* may include aluminum having a resistance which is lower than copper included in the second metal layers 4140*a*, 4140*b*, and 4140*c*.

The interlayer insulation layer 4115 may be disposed on the first substrate 4110 to cover the plurality of circuit devices 4120*a*, 4120*b*, and 4120*c*, the plurality of first metal layers 4130*a*, 4130*b*, and 4130*c*, and the plurality of second metal layers 4140*a*, 4140*b*, and 4140*c* and may include an insulating material such as silicon oxide or silicon nitride.

Lower bonding metals 4171*b* and 4172*b* may be formed on the second metal layer 4140*b* of a word line bonding region WLBA. In the word line bonding region WLBA, the lower bonding metals 4171*b* and 4172*b* of the peripheral circuit region PERI may be electrically connected to upper bonding metals 4271*b* and 4272*b* of the cell region CELL by the bonding manner, and the lower bonding metals 4171*b* and 4172*b* and the upper bonding metals 4271*b* and 4272*b* may include aluminum, copper, or tungsten.

The cell region CELL may provide at least one memory block. The cell region CELL may include a second substrate 4210 and a common source line 4220. A plurality of word lines 4231 to 4238 (collectively, 4230) may be stacked on the second substrate 4210 in a direction (a Z direction) vertical to a top surface of the second substrate 4210. String selection lines and a ground selection line may be respectively disposed on and under the word lines 4230, and the plurality of word lines 4230 may be disposed between the string selection lines and the ground selection line.

In the bit line bonding region BLBA, a channel structure CH may extend in the direction vertical to the top surface of the second substrate 4210 and may pass through the word lines 4230, the string selection lines, and the ground selection lines. The channel structure CH may include a data storage layer, a channel layer, and a buried insulation layer, and the channel layer may be electrically connected to a first metal layer 4250*c* and a second metal layer 4260*c*. For example, the first metal layer 4250*c* may be a bit line contact, and the second metal layer 4260*c* may be a bit line. In an embodiment, the bit line 4260*c* may extend in a first direction (a Y-axis direction) parallel to the top surface of the second substrate 4210.

A region, where the channel structure CH and the bit line 4260*c* are disposed, may be defined as a bit line bonding region BLBA. The bit line 4260*c* may be electrically connected to the circuit devices 4120*c* providing a page buffer 4293 in the peripheral circuit region PERI in the bit line bonding region BLBA. For example, the bit line 4260*c* may be connected to upper bonding metals 4271*c* and 4272*c* in the peripheral circuit region PERI, and the upper bonding metals 4271*c* and 4272*c* may be connected to lower bonding metals 4171*c* and 4172*c* connected to the circuit devices 4120*c* of the page buffer 4293.

In the word line bonding region WLBA, the word lines 4230 may extend in a second direction (an X-axis direction) parallel to the top surface of the second substrate 4210 and may be connected to a plurality of cell contact plugs 4241 to 4247 (collectively, 4240). The word lines 4230 and the cell contact plugs 4240 may be connected to one another at pads which are provided by extending at least some of the word lines 4230 by different lengths in the second direction. A first metal layer 4250*b* and a second metal layer 4260*b* may be sequentially connected to upper portions of the cell contact plugs 4240 connected to the word lines 4230. The cell contact plugs 4240 may be connected to the peripheral circuit region PERI through the upper bonding metals 4271*b* and 4272*b* of the cell region CELL and the lower bonding metals 4171*b* and 4172*b* of the peripheral circuit region PERI, in the word line bonding region WLBA.

The cell contact plugs 4240 may be electrically connected to the circuit devices 4120*b* providing a row decoder 4294 in the peripheral circuit region PERI. In an embodiment, operation voltages of the circuit devices 4120*b* providing the row decoder 4294 may differ from operation voltages of the circuit devices 4120*c* providing the page buffer 4293. For example, the operation voltages of the circuit devices 4120*c* providing the page buffer 4293 may be higher than the operation voltages of the circuit devices 4120*b* providing the row decoder 4294.

A common source line contact plug 4280 may be disposed in an external pad bonding region PA. The common source line contact plug 4280 may include a conductive material such as metal, a metal compound, or polysilicon and may be electrically connected to the common source line 4220. A first metal layer 4250*a* and a second metal layer 4260*a* may be sequentially stacked on the common source line contact plug 4280. For example, a region where the common source line contact plug 4280, the first metal layer 4250*a*, and the second metal layer 4260*a* are disposed may be defined as an external pad bonding region PA.

A plurality of I/O pads (e.g., first and second I/O pads) 4105 and 4205 may be disposed in the external pad bonding region PA. A lower insulation layer 4101 covering a bottom surface of the first substrate 4110 may be formed under the first substrate 4110, and the first I/O pad 4105 may be formed on the lower insulation layer 4101. The first I/O pad 4105 may be connected to, through a first I/O contact plug 4103, at least one of the plurality of circuit devices 4120*a*, 4120*b*, and 4120*c* disposed in the peripheral circuit region PERI and may be separated from the first substrate 4110 by the lower insulation layer 4101. Also, a side insulation layer may be disposed between the first I/O contact plug 4103 and the first substrate 4110 and may electrically disconnect the first I/O contact plug 4103 from the first substrate 4110.

An upper insulation layer 4201 covering a top surface of the second substrate 4210 may be formed on the second substrate 4210, and the second I/O pad 4205 may be formed on the upper insulation layer 4201. The second I/O pad 4205 may be connected to, through a second I/O contact plug 4203, at least one of the plurality of circuit devices 4120*a*, 4120*b*, and 4120*c* disposed in the peripheral circuit region PERI.

The second substrate 4210 and the common source line 4220 may not be disposed in a region where the second I/O contact plug 4203 is disposed. Also, the second I/O pad 4205 may not overlap the word lines 4230 in a third direction (a Z-axis direction). The second I/O contact plug 4203 may be separated from the second substrate 4210 in a direction parallel to the top surface of the second substrate 4210, and moreover, may pass through an interlayer insulation layer 4215 of the cell region CELL and may be connected to the second I/O pad 4205.

The first I/O pad 4105 and the second I/O pad 4205 may be optionally formed. For example, the memory device 4000 may include only the first I/O pad 4105 disposed on the first substrate 4110, or may include only the second I/O pad 4205 disposed on the second substrate 4210. Alternatively, the memory device 4000 may include all of the first I/O pad 4105 and the second I/O pad 4205.

In each of the external pad bonding region PA and the bit line bonding region BLBA included in each of the cell region CELL and the peripheral circuit region PERI, a metal pattern of an uppermost metal layer may be provided as a dummy pattern, or the uppermost metal layer may be empty.

In the external pad bonding region PA, a lower metal pattern 4173*a* having the same shape as that of the upper metal pattern 4272*a* of the cell region CELL may be formed in an uppermost metal layer of the peripheral circuit region PERI, on the basis of the upper metal pattern 4272*a* formed in an uppermost metal layer of the cell region CELL. The lower metal pattern 4173*a* may not be connected to a separate contact in the peripheral circuit region PERI. Similarly, an upper metal pattern having the same shape as that of a lower metal pattern of the peripheral circuit region PERI may be formed in an uppermost metal layer of the cell region CELL, on the basis of a lower metal pattern formed in an uppermost metal layer of the peripheral circuit region PERI.

The lower bonding metals 4171b and 4172b of the peripheral circuit region PERI may be formed on the second metal layer 4140b of the word line bonding region WLBA. The lower bonding metals 4171b and 4172b may be electrically connected to the upper bonding metals 4271b and 4272b of the cell region CELL by the bonding manner.

In the bit line bonding region BLBA, an upper metal pattern 4292 having the same shape as that of a lower metal pattern 4152 may be formed in the uppermost metal layer of the cell region CELL, on the basis of a lower metal pattern 4152 formed in the uppermost metal layer of the peripheral circuit region PERI. A contact may not be formed in the upper metal pattern 4292 formed in the uppermost metal layer of the cell region CELL.

By way of summation and review, an unexpected defect or error caused by a hardware or software problem may occur when an operation of an SSD is performed. Thus, the SSD may collect a state at a time at which an error or a defect occurs, and store the collected state as dump data. Then, the collected dump data may be transferred for debugging to a host connected to the SSD. The dump data may be provided to the host only when the SSD performs an abnormal operation, and thus, the use of the host may be limited to correcting a defect or an error of the SSD. Therefore, it may be difficult to control an internal operation of an SSD on the basis of an environment of a host device or a selection of a user by quickly obtaining real-time state information at a time when a defect or an error does not occur.

As described above, embodiments may provide a storage device and an operating method thereof, wherein an internal operation of the storage device may be controlled on the basis of a selection of a user or an environment of a host device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A storage device, comprising:
a communication circuit; and
a controller, the controller being configured to:
transmit log data to a host device through the communication circuit in response to receiving a first signal from the host device,
receive a second signal, including an operation condition of an algorithm of the storage device, from the host device through the communication circuit, the algorithm including one or more instructions for controlling an operation of the storage device, and
change the operation condition of the algorithm on the basis of the second signal,
wherein the controller is further configured to identify the algorithm on the basis of a specific field within the second signal, the specific field including an indicator indicating the algorithm.

2. The storage device as claimed in claim 1, further comprising a memory, wherein the controller is further configured to store data of a context of the storage device as the log data in the memory.

3. The storage device as claimed in claim 1, wherein the operation condition of the algorithm is determined based on at least one of an environment of the host device, a workload, and a performance option selected by a user.

4. The storage device as claimed in claim 1, wherein the specific field of the second signal includes a first field and a second field.

5. The storage device as claimed in claim 1, wherein:
the controller is further configured to identify the algorithm as a first algorithm when a first value is included in the specific field of the second signal and to identify the algorithm as a second algorithm when a second value is included in the specific field of the second signal,
the first algorithm includes a software-based algorithm, and
the second algorithm includes a hardware-based algorithm.

6. The storage device as claimed in claim 5, wherein:
the first algorithm includes at least one of a patrol read algorithm and a background media scan algorithm,
when the storage device is in an idle state, the first algorithm is identified as the patrol read algorithm, and
when the storage device is in an active state, the first algorithm is identified as the background media scan algorithm.

7. The storage device as claimed in claim 5, wherein the second algorithm includes an error correction code algorithm.

8. An operating method of a storage device, the operating method comprising:
transmitting log data to a host device in response to receiving a first signal from the host device;
receiving a second signal, including an operation condition of an algorithm of the storage device, from the host device; and
changing the operation condition of the algorithm on the basis of the second signal,
identifying the algorithm on the basis of a specific field within the second signal, the specific field including an indicator indicating the algorithm,
wherein the algorithm includes one or more instructions for controlling an operation of the storage device.

9. The operating method as claimed in claim 8, further comprising storing data of a context of the storage device as the log data in a memory.

10. The operating method as claimed in claim 8, wherein the operation condition of the algorithm is determined based on at least one of an environment of the host device, a workload, and a performance option selected by a user.

11. The operating method as claimed in claim 8, wherein the specific field of the second signal includes a first field and a second field.

12. The operating method as claimed in claim 8, wherein:
when a first value is included in the specific field of the second signal, the specific field indicates a first algorithm; and when a second value is included in the specific field of the second signal, the specific field indicates a second algorithm, the first algorithm includes a software-based algorithm, and the second algorithm includes a hardware-based algorithm.

13. The operating method as claimed in claim 12, wherein:

the first algorithm includes at least one of a patrol read algorithm and a background media scan algorithm, when the storage device is in an idle state, the first algorithm is identified as the patrol read algorithm, and when the storage device is in an active state, the first algorithm is identified as the background media scan algorithm.

14. The operating method as claimed in claim 12, wherein the second algorithm includes an error correction code algorithm.

15. A host device, comprising:

a communication circuit; and a controller, the controller being configured to:

transmit a first signal for requesting log data to a storage device through the communication circuit, receive the log data from the storage device through the communication circuit, based on the log data, determine an operation condition of an algorithm of the storage device, the algorithm including one or more instructions for controlling an operation of the storage device, and transmit a second signal, including the determined operation condition of the algorithm, to the storage device through the communication circuit, wherein the second signal includes a specific field that includes an indicator indicating the algorithm.

16. The host device as claimed in claim 15, wherein the controller is further configured to determine the operation condition on the basis of at least one of an environment of the host device, a workload, and a performance option selected by a user.

17. The host device as claimed in claim 16, wherein the operation condition includes a level corresponding to one of an operation time, an operation period, and a maximum operation count of the algorithm.

18. The host device as claimed in claim 15, wherein:

the specific field includes a first field and a second field, which indicate the operation condition of the algorithm.

19. The host device as claimed in claim 15, wherein:

the controller is further configured to input a first value to the specific field of the second signal to indicate a first algorithm, input a second value to the specific field of the second signal to indicate a second algorithm, and the first algorithm includes a software-based algorithm including at least one of a patrol read algorithm and a background media scan algorithm, and the second algorithm includes a hardware-based algorithm including an error correction code algorithm.

20. The host device as claimed in claim 15, wherein the log data includes information about a context of the storage device at a time when the first signal is received.

* * * * *